US012687621B2

(12) United States Patent
Hayashi et al.

(10) Patent No.: US 12,687,621 B2
(45) Date of Patent: Jul. 21, 2026

(54) RANGING DEVICE AND DRIVING METHOD OF RANGING DEVICE

(71) Applicant: CANON KABUSHIKI KAISHA, Tokyo (JP)

(72) Inventors: Hidetoshi Hayashi, Kanagawa (JP); Shogo Yamasaki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 500 days.

(21) Appl. No.: 18/483,889

(22) Filed: Oct. 10, 2023

(65) Prior Publication Data

US 2024/0134017 A1    Apr. 25, 2024
US 2024/0230859 A9    Jul. 11, 2024

(30) Foreign Application Priority Data

Oct. 19, 2022    (JP) ................................. 2022-167639

(51) Int. Cl.
*G01S 7/4865* (2020.01)
*G01S 7/4863* (2020.01)
*G01S 17/14* (2020.01)

(52) U.S. Cl.
CPC .......... *G01S 7/4865* (2013.01); *G01S 7/4863* (2013.01); *G01S 17/14* (2020.01)

(58) Field of Classification Search
None
See application file for complete search history.

(56) References Cited

U.S. PATENT DOCUMENTS

| | | | | |
|---|---|---|---|---|
| 5,627,636 A * | 5/1997 | Nishino | ................. | G01S 7/497 |
| | | | | 356/5.01 |
| 7,768,561 B2 * | 8/2010 | Suzuki | ................... | H04N 25/42 |
| | | | | 348/297 |
| 11,606,517 B1 * | 3/2023 | Sharma | ................. | G01S 17/931 |
| 11,982,750 B2 * | 5/2024 | Akahori | ................ | G01S 7/4865 |
| 12,474,448 B2 * | 11/2025 | Kirillov | ............... | G01S 7/4863 |
| 2009/0167913 A1 * | 7/2009 | Takenaka | ............. | H04N 25/673 |
| | | | | 348/301 |
| 2013/0083403 A1 * | 4/2013 | Takagi | ............... | G02B 27/0172 |
| | | | | 29/592 |

(Continued)

FOREIGN PATENT DOCUMENTS

| | | |
|---|---|---|
| JP | 2020-91117 A | 6/2020 |
| JP | 2020-112443 A | 7/2020 |

*Primary Examiner* — Mohammad J Rahman
(74) *Attorney, Agent, or Firm* — VENABLE LLP

(57) ABSTRACT

A ranging device includes: a processing unit configured to operate in a first mode for outputting a signal based on incident light to a first number of photoelectric conversion elements among photoelectric conversion elements and configured to operate in a second mode for outputting a signal based on incident light to a second number of photoelectric conversion elements among the photoelectric conversion elements, the second number being different from the first number; and a time conversion unit configured to generate a signal indicating a time at which light is incident on a light receiving unit based on a time count value input from a time counting unit and a signal generated in the light receiving unit. Switching from the first mode to the second mode is performed in a period from the start of light emission to the next start of light emission of a light emitting device.

20 Claims, 25 Drawing Sheets

(56)　　　　　　References Cited

U.S. PATENT DOCUMENTS

| 2017/0227643 | A1* | 8/2017 | Nagai | .................. | G01S 7/4914 |
|---|---|---|---|---|---|
| 2019/0033451 | A1* | 1/2019 | Koyama | ................ | G01S 17/10 |
| 2020/0241117 | A1* | 7/2020 | Ochiai | ................ | G01S 7/4817 |
| 2020/0300992 | A1* | 9/2020 | Uetsuka | ............... | G02B 26/101 |
| 2021/0141069 | A1* | 5/2021 | Shimizu | ................ | G01S 7/497 |
| 2021/0190949 | A1* | 6/2021 | Sugimoto | .............. | G01S 17/10 |
| 2022/0075066 | A1* | 3/2022 | Azuma | ............... | G01C 15/002 |
| 2022/0146684 | A1* | 5/2022 | Akahori | ................ | H04N 23/56 |
| 2022/0150424 | A1* | 5/2022 | Numata | ................ | H04N 25/44 |
| 2022/0179079 | A1* | 6/2022 | Wu | ........................ | G01S 17/46 |
| 2022/0187470 | A1* | 6/2022 | Fujisawa | .............. | G01S 7/4876 |
| 2022/0268930 | A1* | 8/2022 | Jo | ........................... | G01C 3/06 |

* cited by examiner

F I G. 2
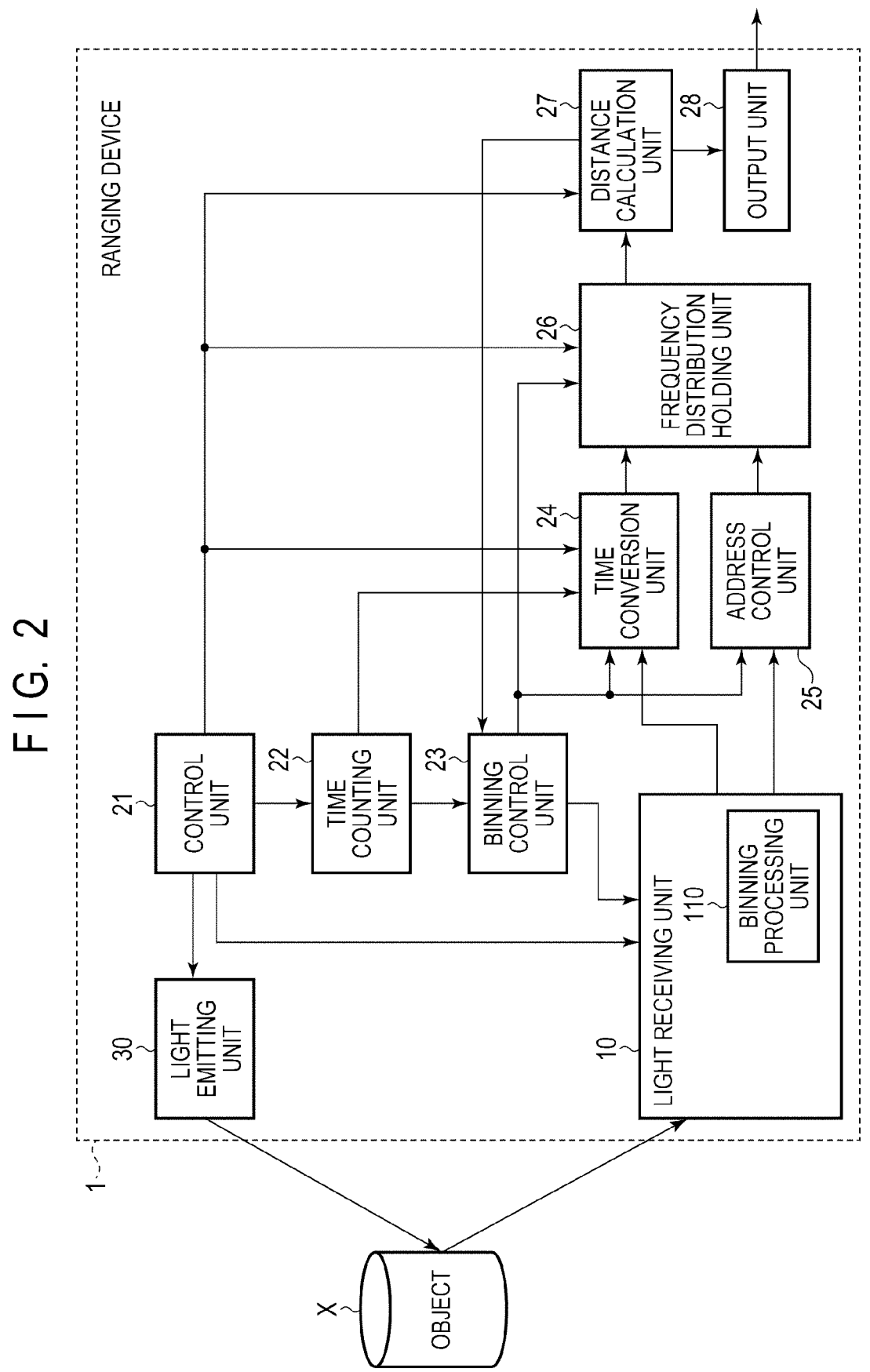

F I G.  4A
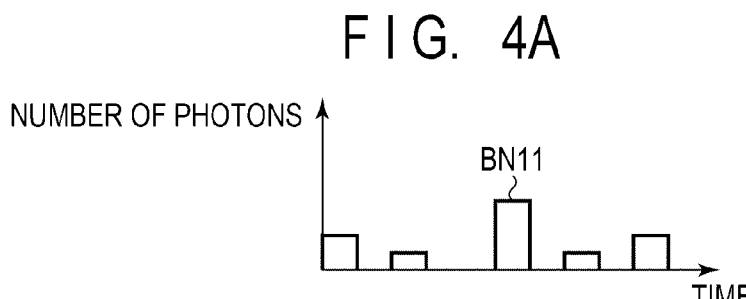
F I G.  4B
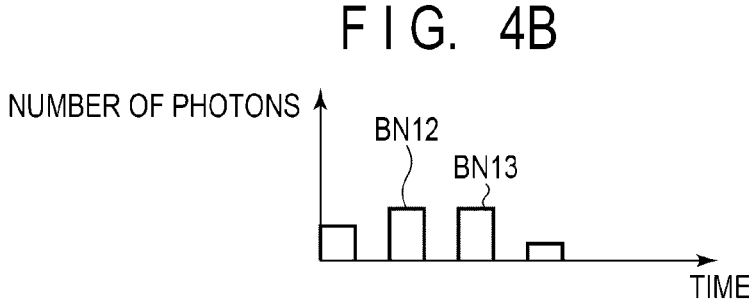
F I G.  4C
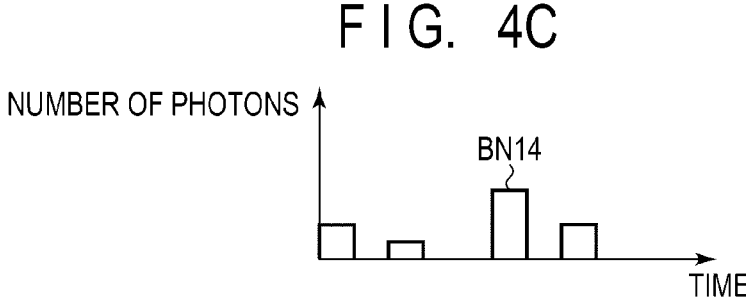
F I G.  4D
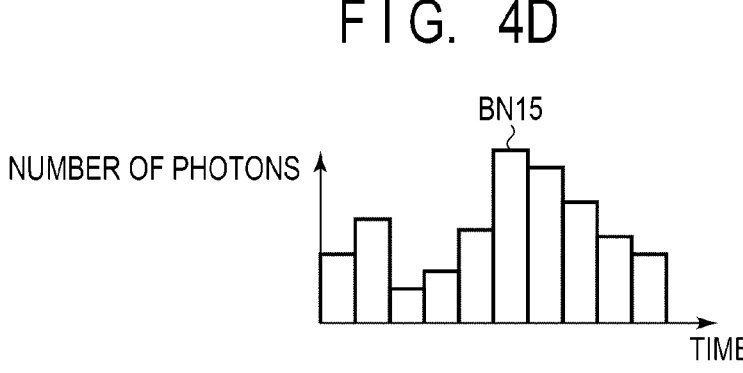

F I G. 8
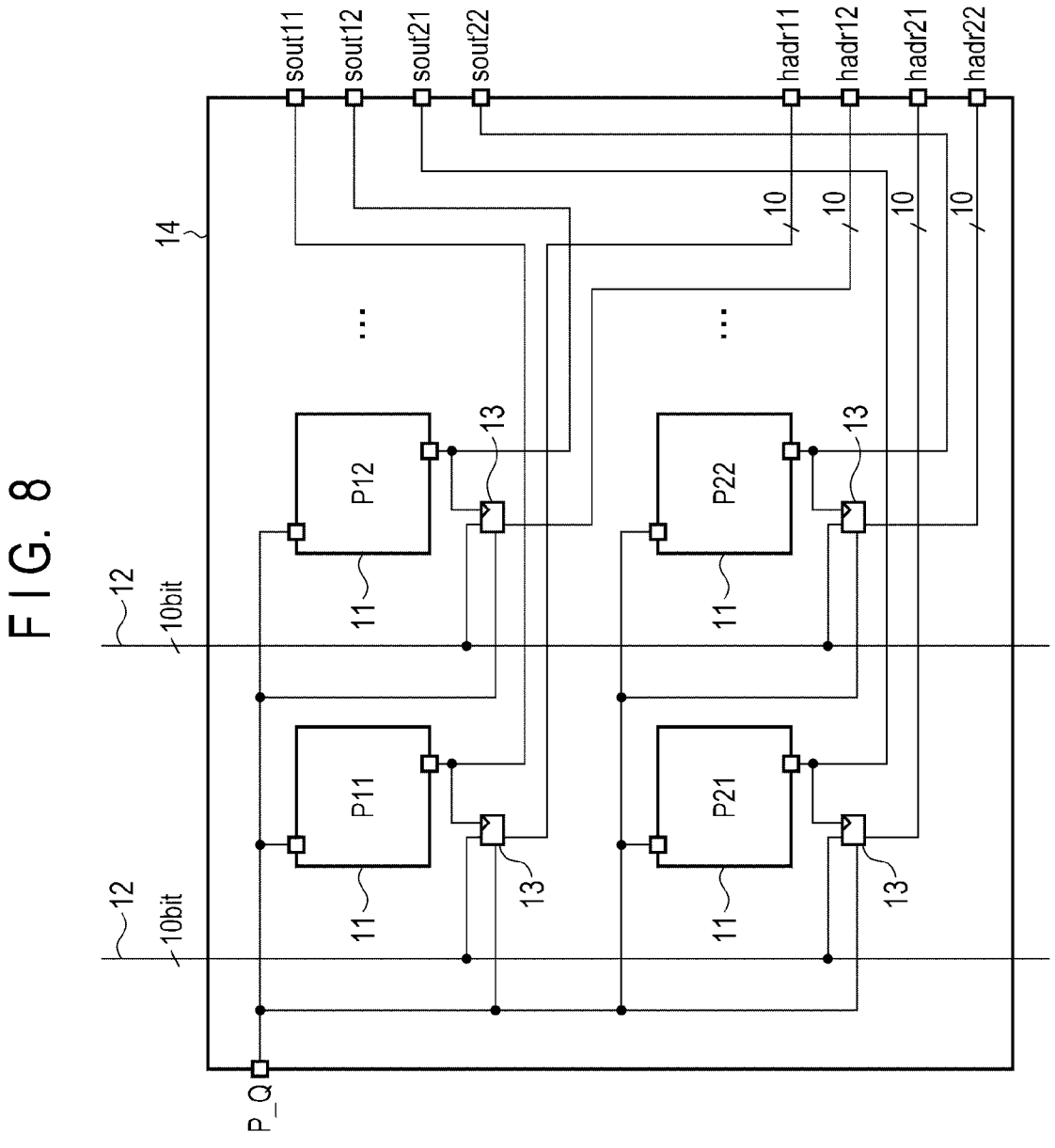

F I G. 9
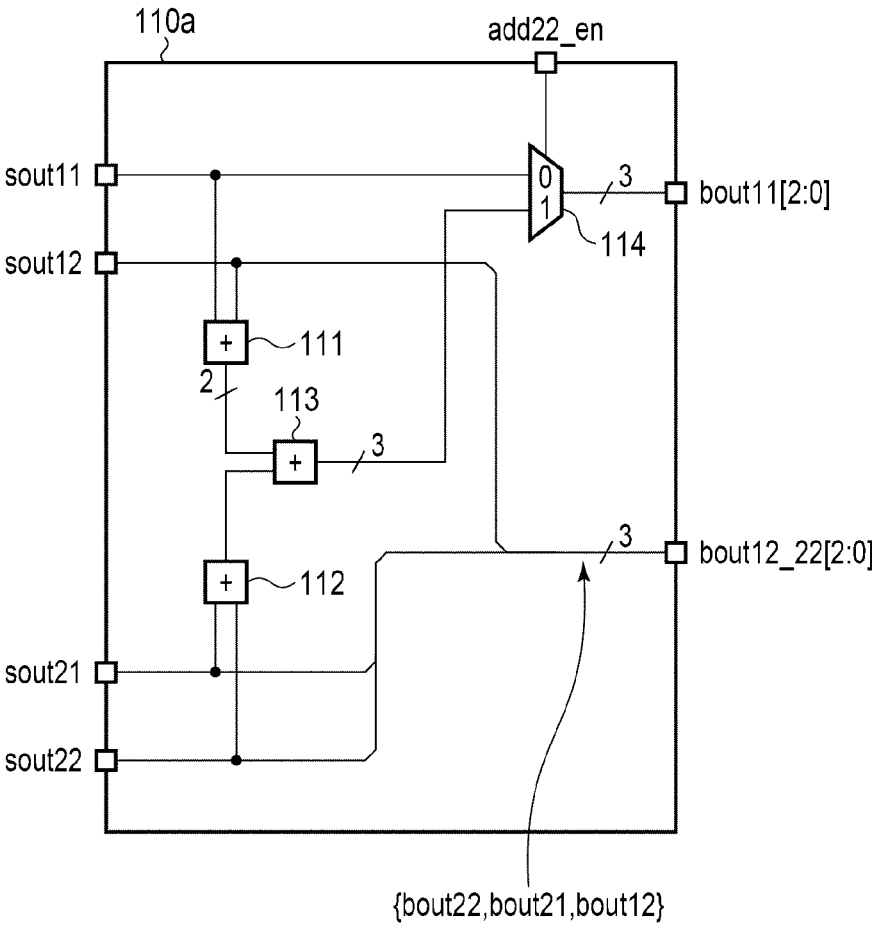

F I G. 10A
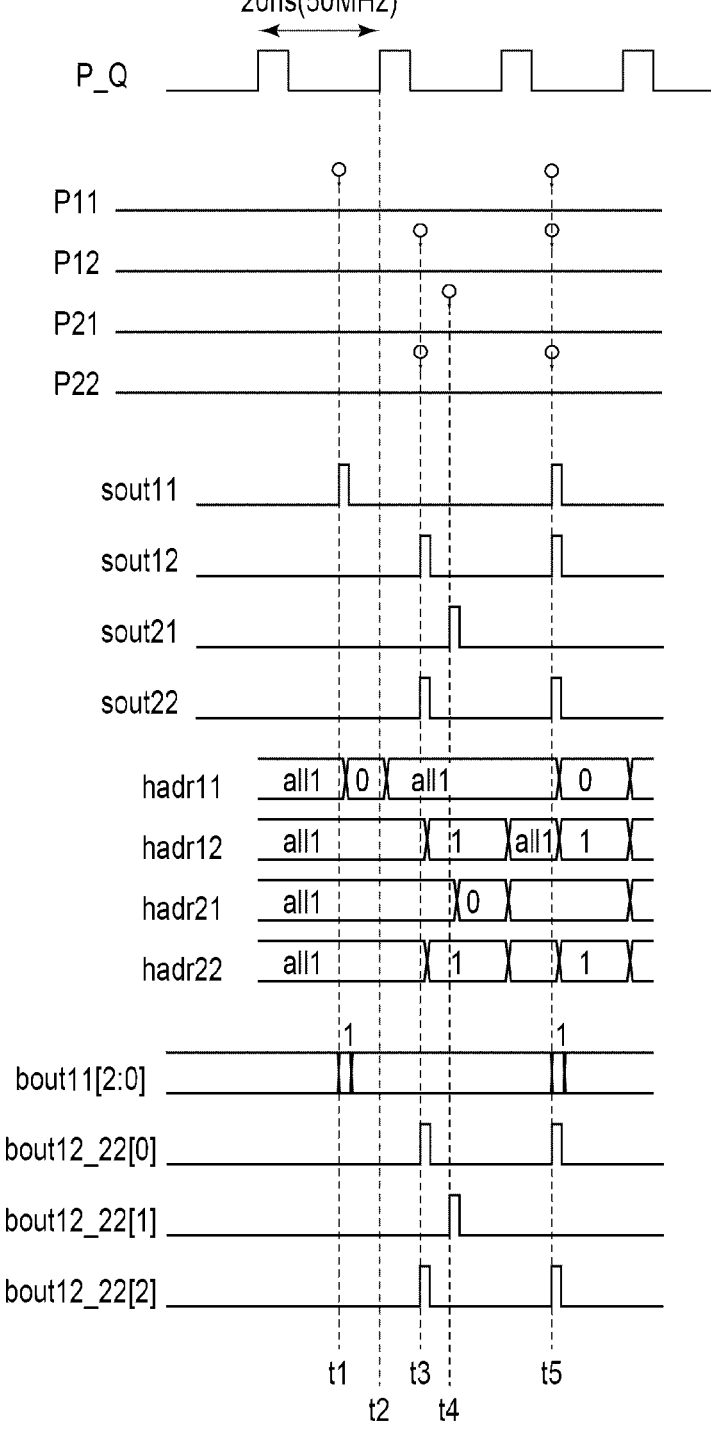

F I G.  10B
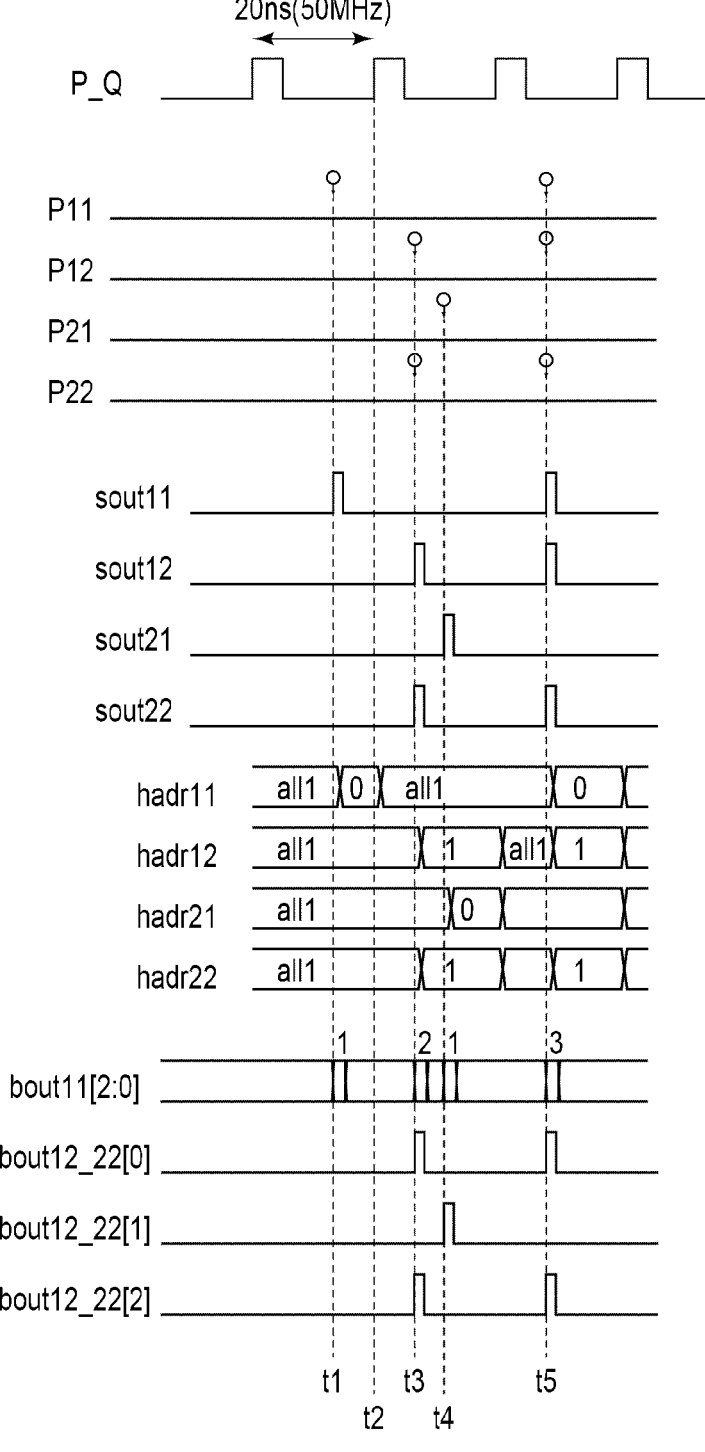

F I G. 11A
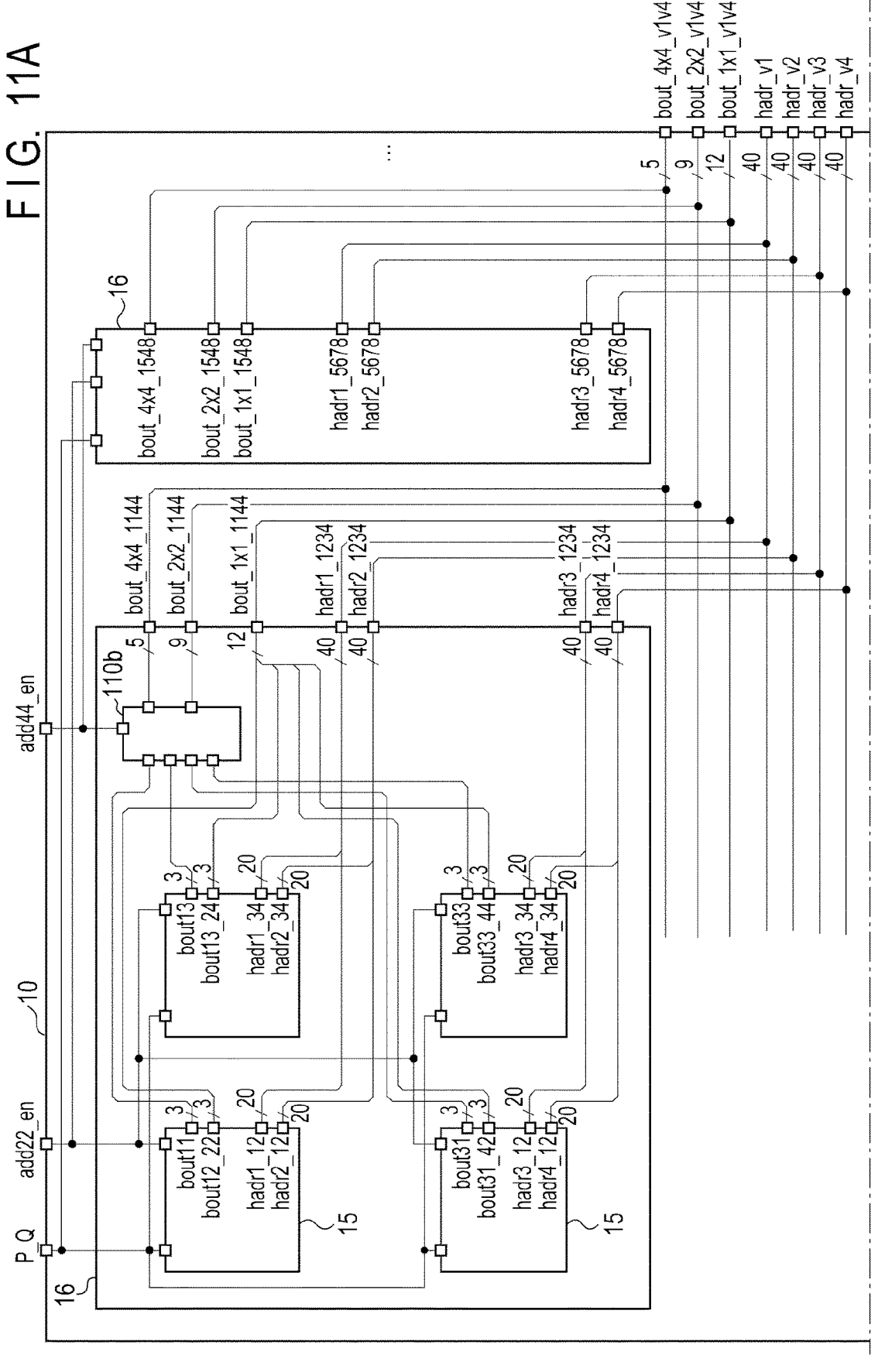

F I G. 11B
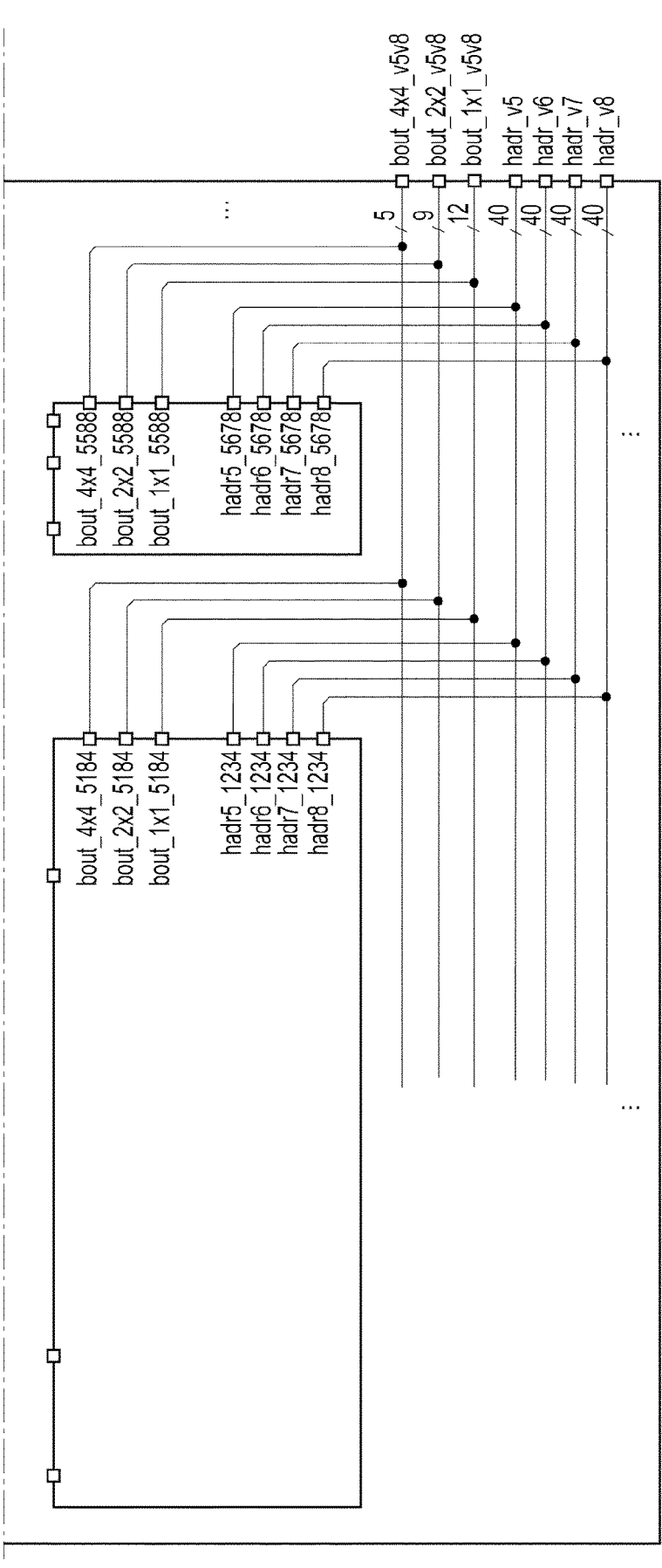

F I G. 12
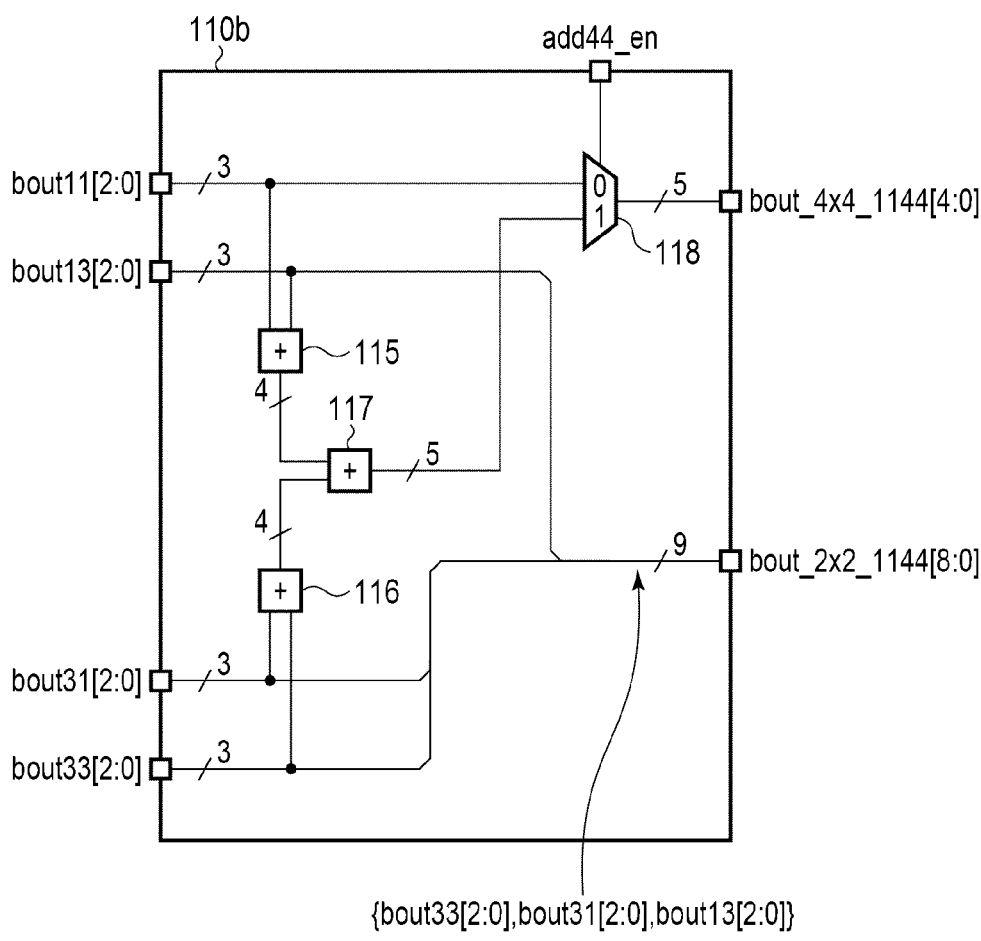

F I G.  13

| P11<br><br>bout_4x4_<br>1144[4:0] | P12<br><br>bout_1x1_<br>1144[0] | P13<br><br>bout_2x2_<br>1144[2:0] | P14<br><br>bout_1x1_<br>1144[3] |
|---|---|---|---|
| P21<br><br>bout_1x1_<br>1144[1] | P22<br><br>bout_1x1_<br>1144[2] | P23<br><br>bout_1x1_<br>1144[4] | P24<br><br>bout_1x1_<br>1144[5] |
| P31<br><br>bout_2x2_<br>1144[5:3] | P32<br><br>bout_1x1_<br>1144[6] | P33<br><br>bout_2x2_<br>1144[8:6] | P34<br><br>bout_1x1_<br>1144[9] |
| P41<br><br>bout_1x1_<br>1144[7] | P42<br><br>bout_1x1_<br>1144[8] | P43<br><br>bout_1x1_<br>1144[10] | P44<br><br>bout_1x1_<br>1144[11] |

F I G. 14A
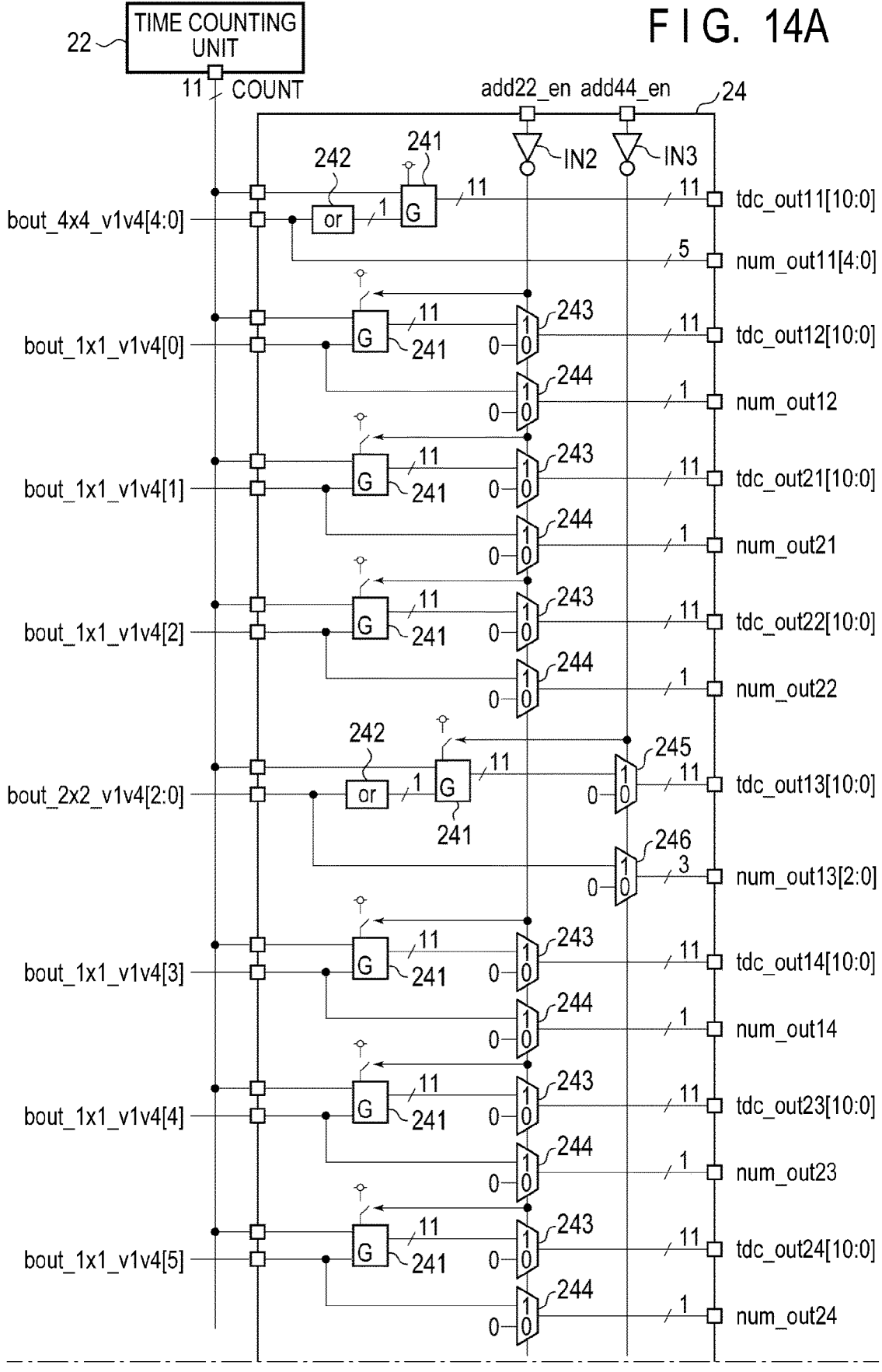

F I G. 14B
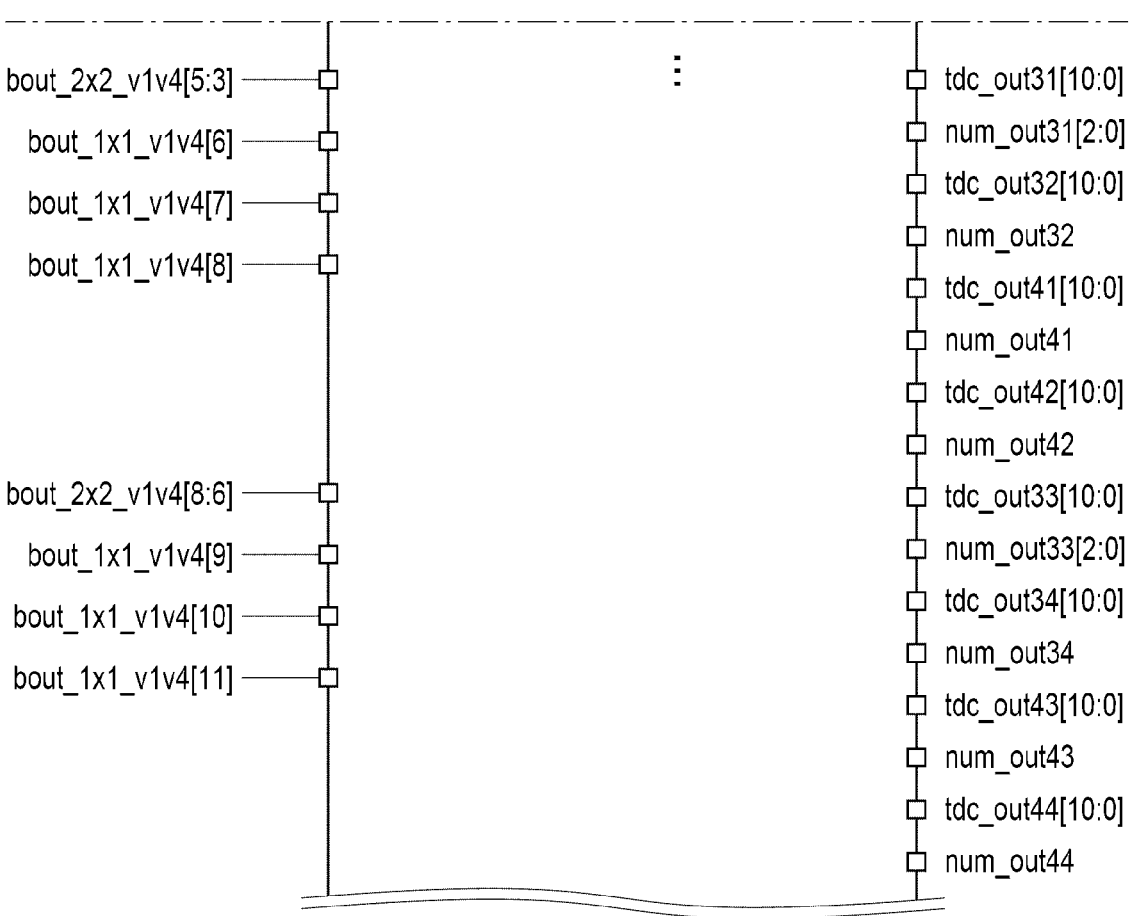

FIG. 17

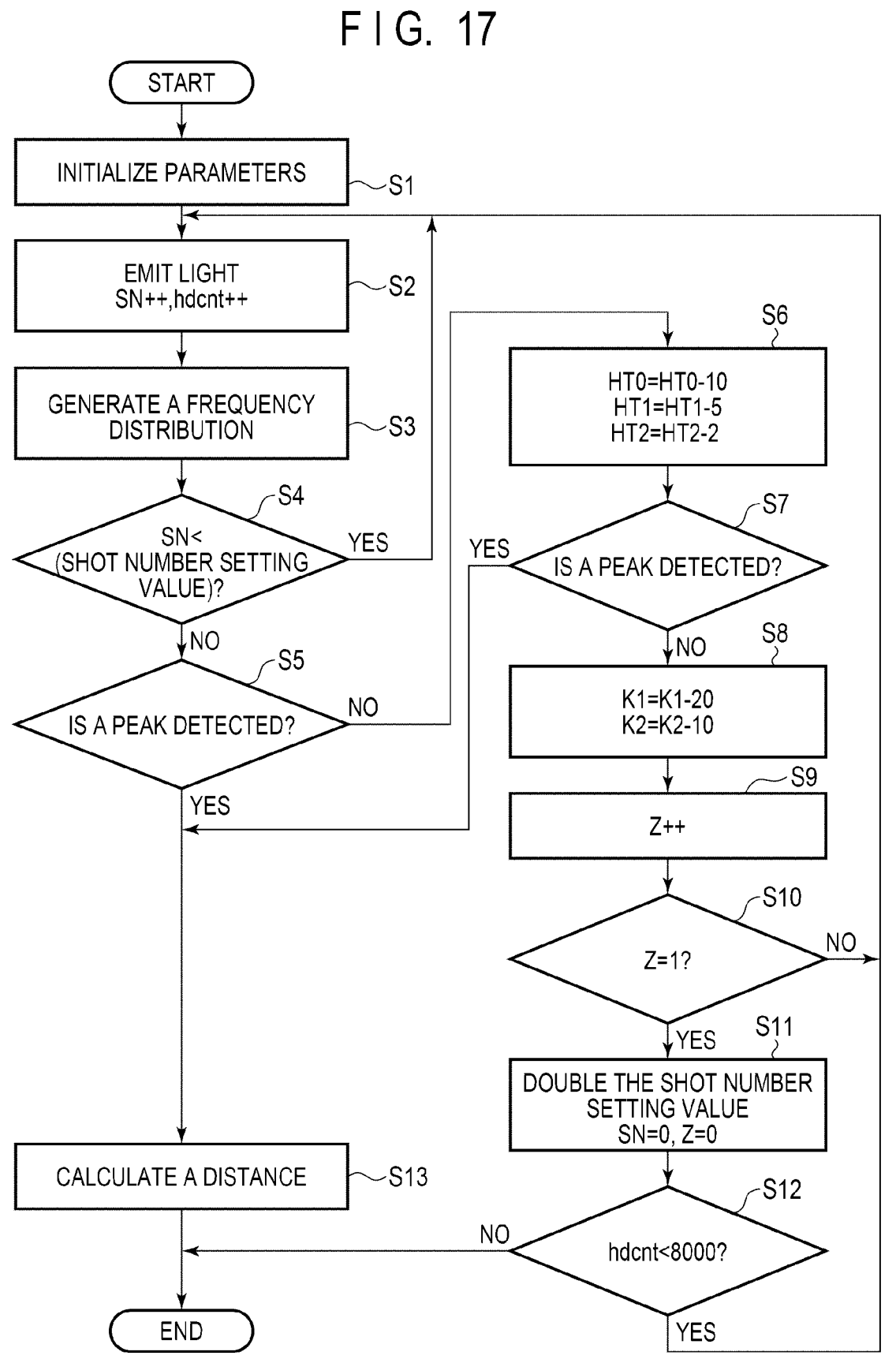

```
            ┌──────────┐
            │  START   │
            └────┬─────┘
                 ↓
      ┌─────────────────────┐
      │ INITIALIZE PARAMETERS│ ──S1
      └──────────┬──────────┘
                 ↓
      ┌─────────────────────┐
      │     EMIT LIGHT       │ ──S2
      │   SN++,hdcnt++       │
      └──────────┬──────────┘
                 ↓
      ┌─────────────────────┐                        ┌──────────────────────┐
      │ GENERATE A FREQUENCY │ ──S3                   │   HT0=HT0-10         │ ──S6
      │    DISTRIBUTION      │                        │   HT1=HT1-5          │
      └──────────┬──────────┘                        │   HT2=HT2-2          │
                 ↓          S4                        └──────────┬───────────┘
             ╱──────────╲                                        ↓          S7
            ╱    SN<      ╲  YES    YES          ╱──────────────────╲
           ╱ (SHOT NUMBER  ╲──────────────────── ╲ IS A PEAK DETECTED? ╲
           ╲  SETTING       ╱                      ╲                  ╱
            ╲  VALUE)?     ╱                         ╲──────┬───────╱
             ╲──────────╱                                   ↓NO        S8
                 ↓NO         S5                    ┌──────────────────────┐
             ╱──────────╲                          │   K1=K1-20           │
            ╱            ╲  NO                      │   K2=K2-10           │
           ╱ IS A PEAK    ╲───────                  └──────────┬───────────┘
           ╲  DETECTED?   ╱                                    ↓          S9
            ╲            ╱                          ┌──────────────────────┐
             ╲──────────╱                           │        Z++           │
                 ↓YES                               └──────────┬───────────┘
                                                               ↓          S10
                                                        ╱──────────────╲  NO
                                                       ╱     Z=1?        ╲───────
                                                       ╲                 ╱
                                                        ╲──────────────╱
                                                               ↓YES       S11
                                                    ┌──────────────────────┐
                                                    │ DOUBLE THE SHOT NUMBER│
      ┌─────────────────────┐                       │   SETTING VALUE      │
      │ CALCULATE A DISTANCE │ ──S13                 │   SN=0, Z=0          │
      └──────────┬──────────┘                       └──────────┬───────────┘
                 ↓                                             ↓          S12
            ┌─────────┐                          ╱──────────────────╲
            │   END   │                     NO  ╱    hdcnt<8000?      ╲
            └─────────┘                 ───────╲                     ╱
                                                ╲──────────────────╱
                                                        ↓YES
```

F I G. 18A
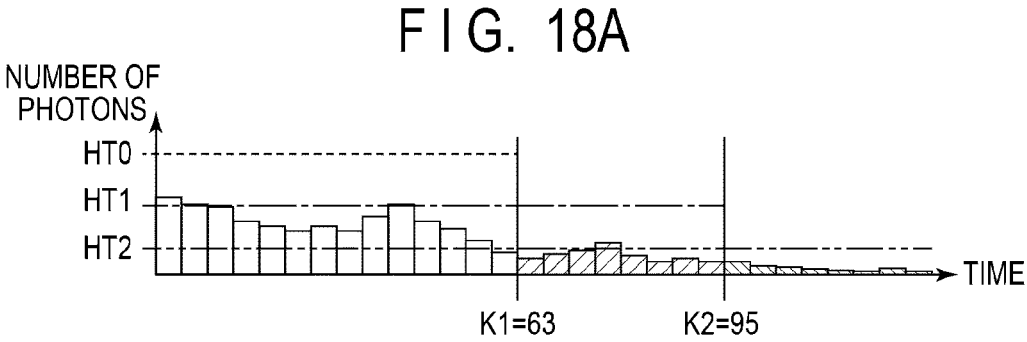
F I G. 18B
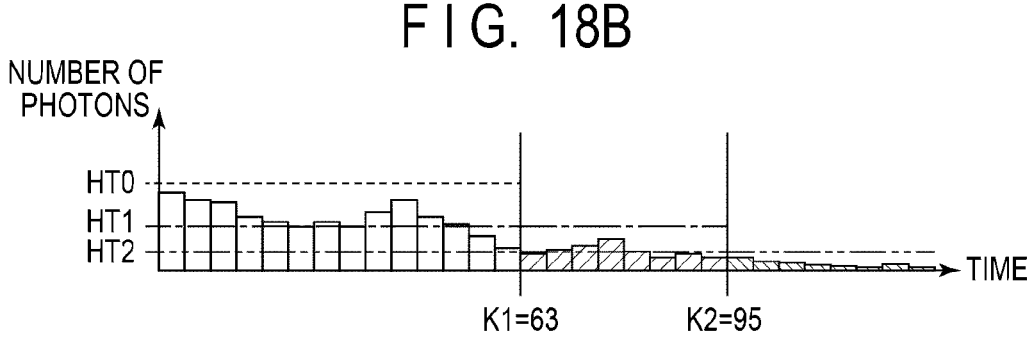
F I G. 18C
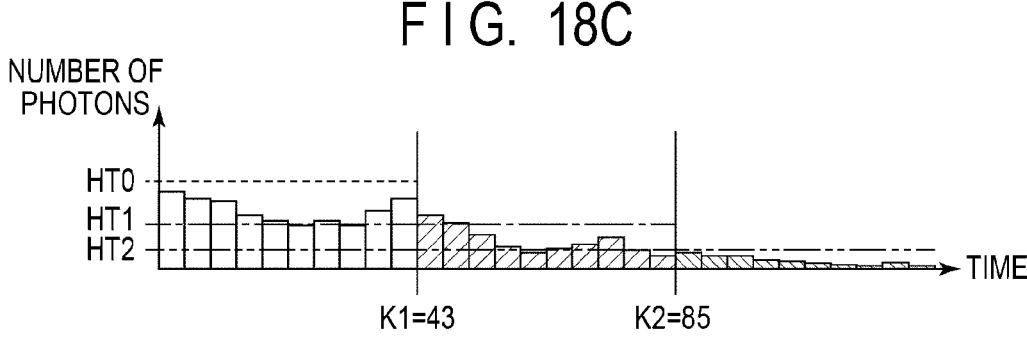
F I G. 18D
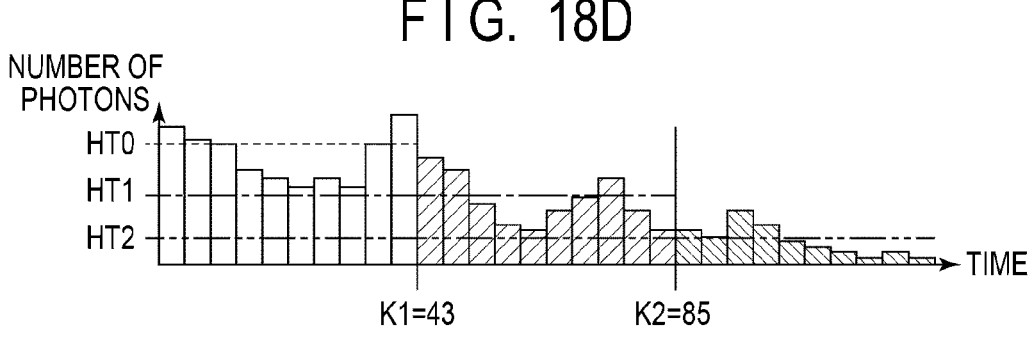

F I G. 19

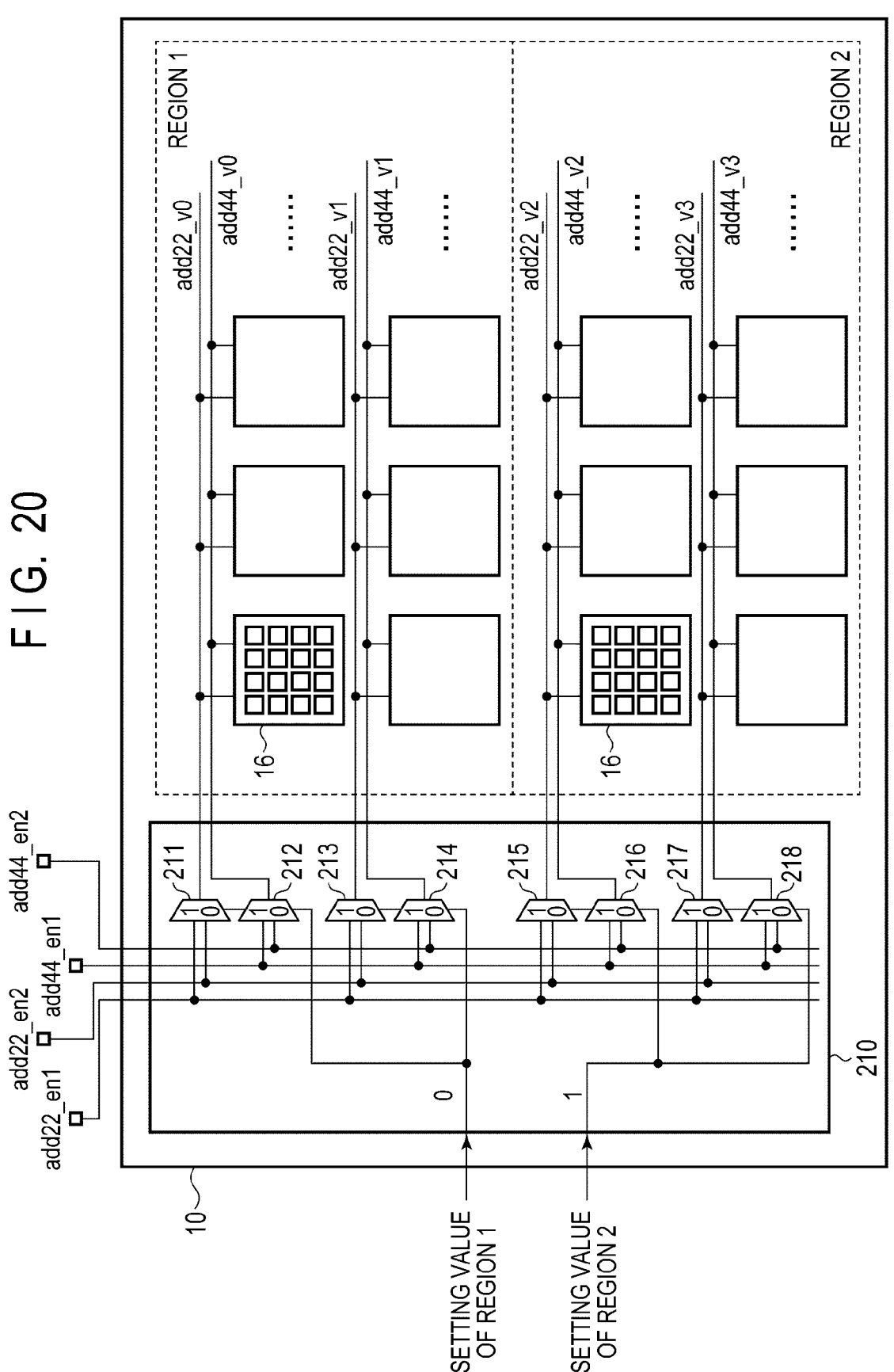
F I G. 20

FIG. 21

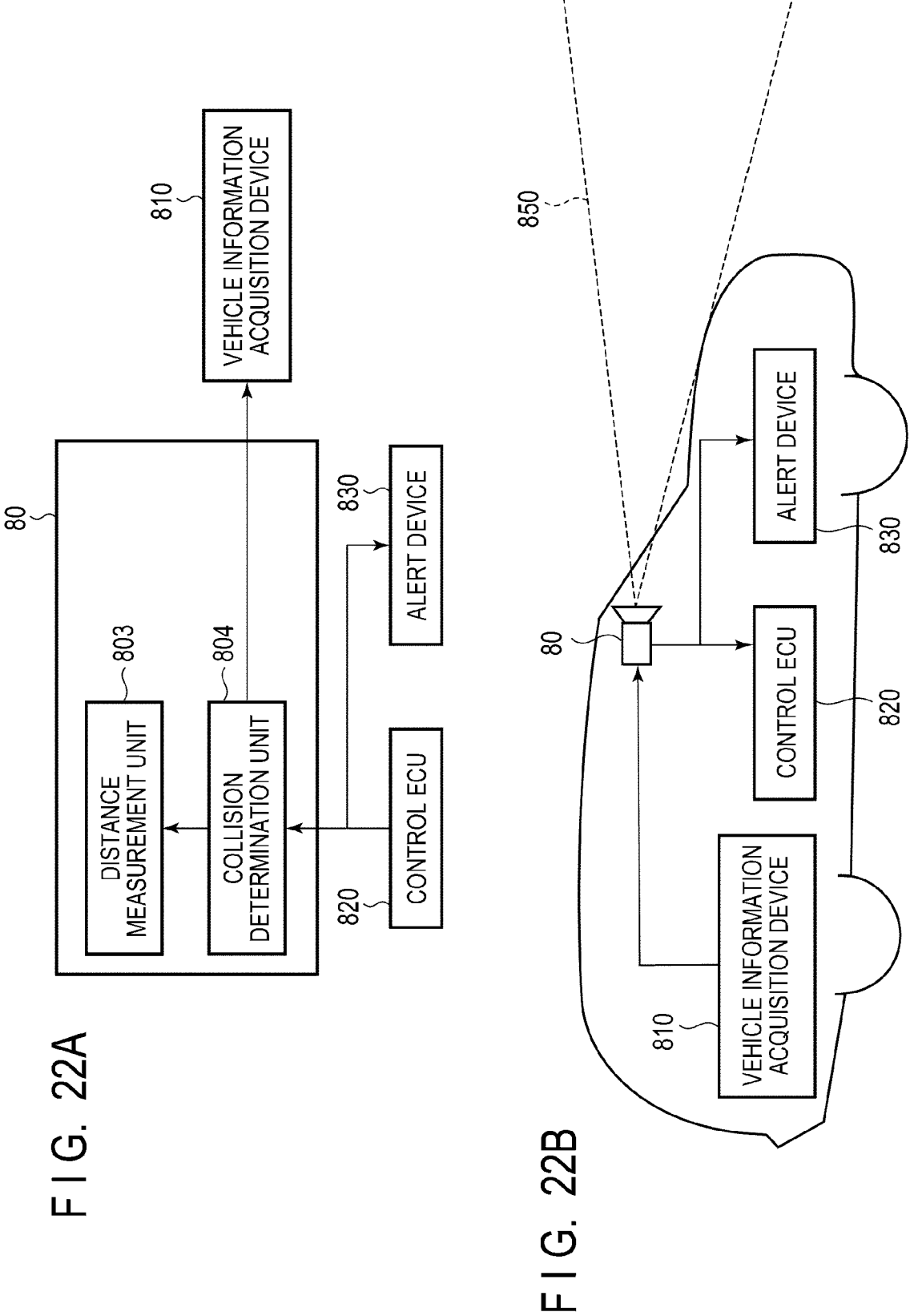
F I G. 22A
F I G. 22B

RANGING DEVICE AND DRIVING METHOD OF RANGING DEVICE

BACKGROUND OF THE INVENTION

Field of the Invention

The present disclosure relates to a ranging device and a driving method of the ranging device.

Description of the Related Art

Japanese Patent Application Laid-Open No. 2020-91117 discloses a ranging device based on a time-of-flight (ToF) method. The ranging device disclosed in Japanese Patent Application Laid-Open No. 2020-91117 can operate in several pixel modes so that the distance range in which ranging can be performed and the number of light receiving elements added in parallel can be varied. The plurality of pixel modes are set such that the larger the distance range in which ranging is performed is, the more signals of the light receiving elements are added in parallel.

Japanese Patent Application Laid-Open No. 2020-112443 discloses a ranging device capable of varying the number of light receiving elements that are to be added for each region of a pixel array.

In a ranging method as described in Japanese Patent Application Laid-Open No. 2020-91117 or Japanese Patent Application Laid-Open No. 2020-112443, a plurality of frames may be necessary in order to measure both a short distance and a long distance with appropriate accuracy. Accordingly, in a scene such as ranging of a moving object, followability may be a problem.

It is an object of the present disclosure to provide a ranging device and a driving method of the ranging device with improved followability.

SUMMARY OF THE INVENTION

According to a disclosure of the present specification, there is provided a ranging device including: a light receiving unit configured to generate a signal based on incident light to each of a plurality of photoelectric conversion elements; a time counting unit configured to perform time counting; a control unit configured to control a light emission timing of a light emitting device that periodically emits light and a timing at which the time counting unit starts time counting; a processing unit configured to operate in a first mode for outputting a signal based on incident light to a first number of photoelectric conversion elements among the plurality of photoelectric conversion elements and configured to operate in a second mode for outputting a signal based on incident light to a second number of photoelectric conversion elements among the plurality of photoelectric conversion elements, the second number being different from the first number; and a time conversion unit configured to generate a signal indicating a time at which light is incident on the light receiving unit based on a time count value input from the time counting unit and a signal generated in the light receiving unit. Switching from the first mode to the second mode is performed in a period from the start of light emission of the light emitting device to the next start of light emission of the light emitting device.

According to a disclosure of the present specification, there is provided a driving method of a ranging device. The ranging device including: a light receiving unit configured to generate a signal based on incident light to each of a plurality of photoelectric conversion elements; a time counting unit configured to perform time counting; a control unit configured to control a light emission timing of a light emitting device that periodically emits light and a timing at which the time counting unit starts time counting; and a time conversion unit configured to generate a signal indicating a time at which light is incident on the light receiving unit based on a time count value input from the time counting unit and a signal generated in the light receiving unit. The driving method including: in a period from the start of light emission of the light emitting device to the next start of light emission of the light emitting device, operating in a first mode for outputting a signal based on incident light to a first number of photoelectric conversion elements among the plurality of photoelectric conversion elements, and operating in a second mode for outputting a signal based on incident light to a second number of photoelectric conversion elements among the plurality of photoelectric conversion elements, the second number being different from the first number.

Further features of the present invention will become apparent from the following description of exemplary embodiments with reference to the attached drawings.

BRIEF DESCRIPTION OF THE DRAWINGS

FIG. 2 is a functional block diagram illustrating a schematic configuration example of the ranging device according to the first embodiment.

FIGS. 4A, 4B, 4C, and 4D are histograms visually illustrating frequency distributions of pulse count values according to the first embodiment.

FIG. 8 is a diagram illustrating a configuration example of the pixel block according to the first embodiment.

FIG. 9 is a diagram illustrating a configuration example of a binning processing unit according to the first embodiment.

FIGS. 10A and 10B are timing charts illustrating the operation of the pixel block according to the first embodiment.

FIGS. 11A and 11B are diagrams illustrating a configuration example of a pixel block according to the first embodiment.

FIG. 12 is a diagram illustrating a configuration example of the binning processing unit according to the first embodiment.

FIG. 13 is a correspondence diagram of 4×4 binning processing according to the first embodiment.

FIGS. 14A and 14B are diagrams illustrating a configuration example of a time counting unit and a time conversion unit according to the first embodiment.

FIG. 17 is a diagram illustrating operation timings of ranging according to a second embodiment.

FIGS. 18A, 18B, 18C, and 18D are histograms illustrating an outline of processing according to the second embodiment.

FIG. 19 is a functional block diagram illustrating a schematic configuration example of a ranging device according to a third embodiment.

FIG. 20 is a diagram illustrating a configuration example of a vertical control unit according to the third embodiment.

FIG. 21 is a diagram illustrating an operation example of the ranging device according to the third embodiment.

FIGS. 22A and 22B are schematic diagrams of equipment according to a fourth embodiment.

DESCRIPTION OF THE EMBODIMENTS

Figure 1:
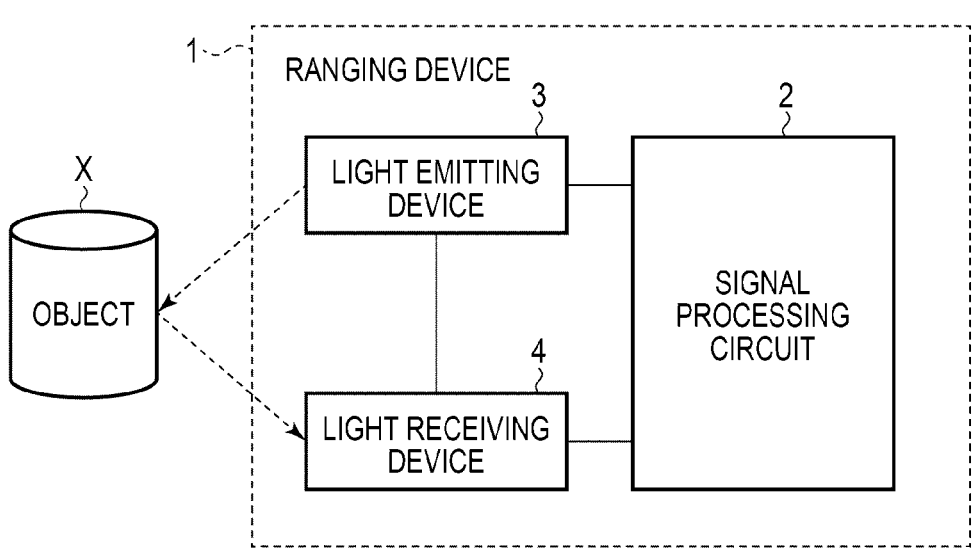
FIG. 1 is a hardware block diagram illustrating a schematic configuration example of a ranging device according to a first embodiment.

Hereinafter, embodiments of the present disclosure will be described with reference to the drawings. In the drawings, the same or corresponding elements are denoted by the same reference numerals, and the description thereof may be omitted or simplified.

First Embodiment

FIG. 1 is a hardware block diagram illustrating a schematic configuration example of a ranging device 1 according to the present embodiment. The ranging device 1 includes a signal processing circuit 2, a light emitting device 3, and a light receiving device 4. Note that the configuration of the ranging device 1 illustrated in the present embodiment is an example, and is not limited to the illustrated configuration.

The ranging device 1 is a device for measuring a distance to an object X for the ranging using a technology such as light detection and ranging (LiDAR). The ranging device 1 measures the distance from the ranging device 1 to the object X based on a time difference until light emitted from the light emitting device 3 is reflected by the object X and received by the light receiving device 4. Further, the ranging device 1 can measure distances at a plurality of points in a two-dimensional manner by emitting laser light to a predetermined ranging area including the object X and receiving reflected light by a pixel array. Thus, the ranging device 1 can generate and output a distance image. Such a scheme is sometimes referred to as flash LiDAR.

The light received by the light receiving device 4 includes ambient light such as sunlight in addition to the reflected light from the object X. For this reason, the ranging device 1 measures incident light in each of a plurality of periods (bin periods), and performs distance measurement in which influence of ambient light is reduced by using a method of determining that reflected light is incident in a period in which the amount of light peaks.

The light emitting device 3 emits light such as laser light to the outside of the ranging device 1. The signal processing circuit 2 may include a processor that performs arithmetic processing of digital signals, a memory that stores digital signals, and the like. The memory may be, for example, a semiconductor memory.

The light receiving device 4 generates a pulse signal including a pulse based on the incident light. The light receiving device 4 is, for example, a photoelectric conversion device including an avalanche photodiode as a photoelectric conversion element. In this case, when one photon is incident on the avalanche photodiode and a charge is generated, one pulse is generated by avalanche multiplication. However, the light receiving device 4 may include, for example, a photoelectric conversion element using another photodiode. The light receiving device 4 includes a plurality of photoelectric conversion elements, and can output a signal indicating an address of a photoelectric conversion element into which a photon is incident.

FIG. 2 is a functional block diagram illustrating a schematic configuration example of the ranging device 1 according to the present embodiment. The ranging device 1 includes a light receiving unit 10, a light emitting unit 30, a control unit 21, a time counting unit 22, a binning control unit 23, a time conversion unit 24, an address control unit 25, a frequency distribution holding unit 26, a distance calculation unit 27, and an output unit 28. The light receiving unit 10 includes a binning processing unit 110. The light receiving unit 10 and the light emitting unit 30 correspond to the light receiving device 4 and the light emitting device 3 in FIG. 1, respectively. The control unit 21, the time counting unit 22, the binning control unit 23, the time conversion unit 24, the address control unit 25, the frequency distribution holding unit 26, the distance calculation unit 27, and the output unit 28 correspond to the signal processing circuit 2 in FIG. 1.

The control unit 21 synchronously controls a light emission timing of the light emitting unit 30 and a timing at which the time counting unit 22 starts time counting. Further, the control unit 21 performs operation control of frame periods of the entire ranging device 1. That is, the control unit 21 controls the light emission and the start of time counting periodically a plurality of times in one frame period. The control unit 21 controls the processing start timing of each of the light receiving unit 10, the time conversion unit 24, the frequency distribution holding unit 26, and the distance calculation unit 27.

The time counting unit 22 performs time counting based on the control of the control unit 21, and acquires an elapsed time from the time at which counting is started as a digital signal. Thus, the time counting unit 22 can count the elapsed time from the light emission by the light emitting unit 30. The time counting unit 22 includes, for example, a circuit such as a ring oscillator and a counter, and counts a clock pulse that vibrates at a certain period to perform time counting.

The binning processing unit 110 (processing unit) detects the number of photons incident on one or a plurality of photoelectric conversion elements arranged within a predetermined area. In other words, the binning processing unit 110 performs binning processing for integrating outputs of photoelectric conversion elements within a predetermined area. The binning processing unit 110 is controlled by a control signal output from the binning control unit 23. The binning control unit 23 controls the timing of changing a binning condition based on time information from the time counting unit 22 and a setting value separately set.

A timing pulse indicating a light reception timing in the light receiving unit 10 is input to the time conversion unit 24. The time information is also input to the time conversion unit 24 from the time counting unit 22. The time conversion unit 24 holds the time information corresponding to the light reception timing in accordance with the timing pulse, and outputs the time information to the frequency distribution holding unit 26. In this way, the time conversion unit 24 converts the timing pulse from the light receiving unit 10 into time, thereby acquiring the time information indicating an elapsed time from the light emission time to the arrival time of the reflected light.

The light receiving unit 10 outputs a signal indicating an address of the photoelectric conversion element on which the photons are incident to the address control unit 25. The address control unit 25 outputs address data to the frequency distribution holding unit 26.

The frequency distribution holding unit 26 generates and holds a frequency distribution based on the time information output from the time conversion unit 24 and the address data output from the address control unit 25. The frequency distribution is information in which a class determined for each predetermined time interval is associated with a frequency of incidence of photons in each class. The frequency distribution is held in a memory constituting the frequency distribution holding unit 26 individually for each pixel of the light receiving unit 10.

The distance calculation unit 27 detects a peak of the frequency distribution held in the frequency distribution holding unit 26. Then, the distance calculation unit 27 calculates distance information indicating the distance from the ranging device 1 to the object X by converting the time corresponding to the peak into the distance. The output unit 28 outputs the distance information to the outside of the ranging device 1 in a predetermined format. The result of the peak detection may be output to the binning control unit 23.

Figure 3:
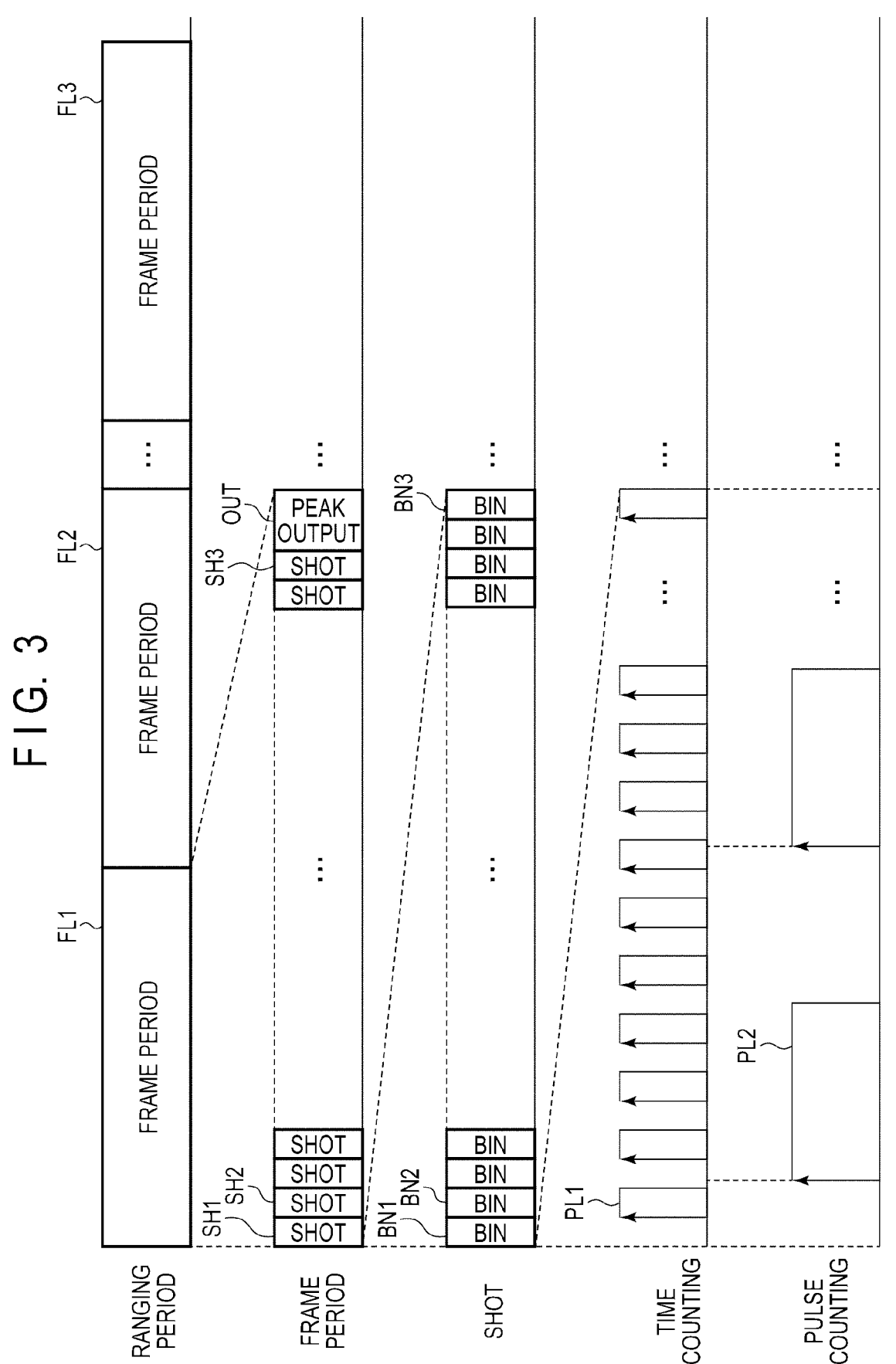
FIG. 3 is a diagram illustrating an outline of an operation of the ranging device in one ranging period according to the first embodiment.

FIG. 3 is a diagram illustrating an outline of an operation of the ranging device 1 according to the present embodiment in one ranging period. In the description of FIG. 3, it is assumed that the ranging device 1 is a flash LiDAR. In the "ranging period" of FIG. 3, a plurality of frame periods included in one ranging period are illustrated. A frame period FL1 indicates the first frame period in one ranging period. The frame period is a period in which the ranging device 1 performs one ranging and outputs a signal indicating a distance (ranging result) from the ranging device 1 to the object X to the outside. After the frame period FL1, similar frame periods FL2, . . . , FL3 are repeated until the ranging period ends.

In the "frame period" of FIG. 3, a plurality of shots SH1, SH2, . . . , SH3 included in the frame period FL1 and a peak output OUT are illustrated. The shot is one period in which the light emitting unit 30 emits light once and the frequency distribution is updated by the light reception count value based on the light emission. That is, one shot period is a period from the start of light emission by the light emitting unit 30 to the next start of light emission. The peak output OUT indicates a period during which a ranging result is output based on peaks acquired by accumulating signals of a plurality of shots.

The "shot" in FIG. 3 illustrates a plurality of bins BN1, BN2, . . . , BN3 in the acquisition period of the shot SH1. The bin represent one time interval corresponding to one class width of the frequency distribution. The bin BN1 indicates the first bin in the shot SH1. The bin BN2 indicates the second bin in the shot SH1. The bin BN3 indicates the last bin in the shot SH1.

The "time counting" in FIG. 3 schematically illustrates a pulse PL1 used for time counting in the time counting unit 22. As illustrated in FIG. 3, the time counting unit 22 generates a time count value by counting the pulse PL1 that rises periodically. When the time count value reaches a predetermined value, the bin BN1 ends, and the process transitions to the next bin BN2. Although FIG. 3 illustrates an example in which a plurality of time count values correspond to one bin, one time count value may correspond to one bin.

The "pulse counting" in FIG. 3 schematically illustrates a pulse PL2 based on the incident light to the light receiving unit 10. When one photon is incident on the light receiving unit 10, one pulse PL2 rises. In the example of FIG. 3, two pulses rise in the period of the bin BN1, and "2" is acquired as the light reception count value of the bin BN1. Similarly, the light reception count values are sequentially acquired for the bin BN2 and after the BN2. As illustrated in FIG. 3, frequency of the pulse PL1 of the time counting is desirably set sufficiently higher than the frequency of the rising edge of the pulse PL2 of the pulse counting. In this case, the number of pulses PL2 can be counted more appropriately.

FIGS. 4A to 4D are histograms visually illustrating the frequency distribution of the light reception count values counted in the light receiving unit 10. In the present specification, the frequency distribution is frequency information corresponding to a predetermined class width, and is not necessarily displayed visually. FIGS. 4A to 4D are examples for explaining the outline of the frequency distribution, and may be different from the frequency distribution actually acquired by the ranging device 1 of the present embodiment. FIGS. 4A, 4B, and 4C illustrate examples of histograms of the number of photons (corresponding to the light reception count value) in the first shot, the second shot, and the third shot, respectively. FIG. 4D illustrates an example of a histogram obtained by accumulating the number of photons of all shots. The horizontal axis represents the elapsed time from light emission. One interval of the histogram corresponds to a period of one bin in which photon detection is performed. The vertical axis represents the number of photons detected for each bin period.

As illustrated in FIG. 4A, in the first shot, the number of photons of the sixth bin BN11 is a peak. As illustrated in FIG. 4B, in the second shot, the number of photons of the third bin BN12 is equal to the number of photons of the fifth bin BN13, and these are peaks. As illustrated in FIG. 4C, in the third shot, the number of photons of the sixth bin BN14 is a peak. In the second shot, different bins from the other shots are the peaks. This is due to light reception count values due to ambient light other than the reflected light from the object X.

As illustrated in FIG. 4D, in the histogram obtained by accumulating the number of photons of all shots, the sixth bin BN15 is a peak. This peak bin corresponds to a distance between the ranging device 1 and the object X.

By accumulating the light reception count values of a plurality of shots, even when light reception count values due to ambient light is included as in the second shot of FIG. 4B, it is possible to detect a bin having a high possibility of reflected light from the object X with higher accuracy. Therefore, even when the light emitted from the light emitting unit 30 is weak, the ranging can be performed with high accuracy by employing a process in which a plurality of shots are repeated.

Figure 5:
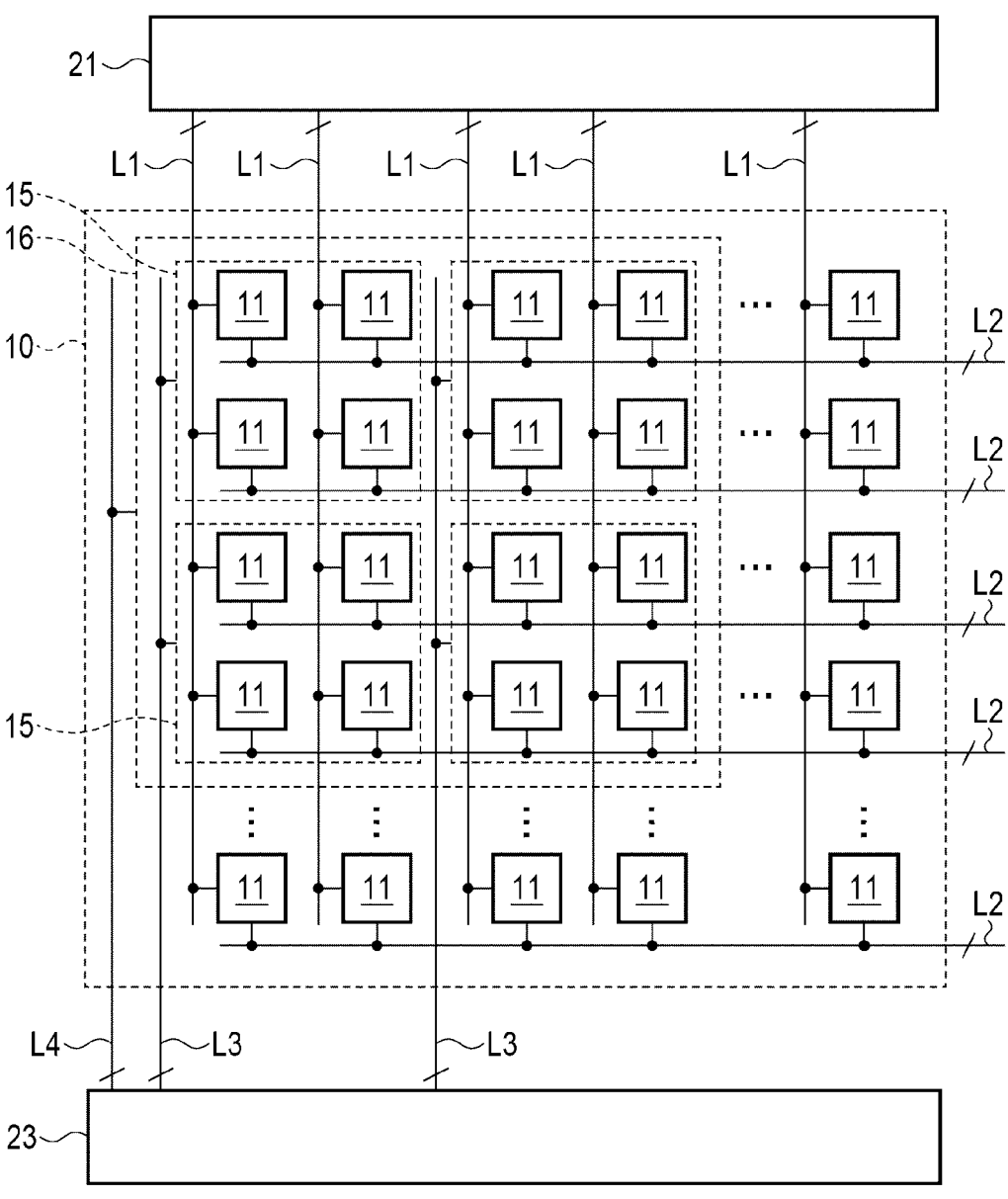
FIG. 5 is a block diagram illustrating a pixel arrangement of the light receiving unit according to the first embodiment.

FIG. 5 is a block diagram illustrating a pixel arrangement of the light receiving unit 10 according to the present embodiment. The light receiving unit 10 includes a plurality of pixels 11 arranged to form a plurality of rows and a plurality of columns. Each of the plurality of pixels 11 includes an avalanche photodiode as a photoelectric conversion element. The control unit 21 outputs a control signal to each of the plurality of pixels 11 via corresponding one of a plurality of control lines L1. Each pixel 11 outputs a signal to the outside of the light receiving unit 10 via corresponding one of a plurality of signal lines L2 according to the control signal. More specifically, the plurality of signal lines L2 is connected to the time conversion unit 24 and the address control unit 25 illustrated in FIG. 2.

The light receiving unit 10 of the present embodiment has a function of performing binning processing. A pixel block 15 is a pixel group in which binning of four pixels arranged in two rows and two columns (2×2 binning) is performed. A pixel block 16 includes four pixel blocks 15 arranged in two rows and two columns. That is, the pixel block 16 is a pixel group in which binning of 16 pixels arranged in four rows and four columns (4×4 binning) is performed. Although not illustrated in FIG. 5, a plurality of pixel blocks 16 is arranged in the light receiving unit 10 so as to form a plurality of rows and a plurality of columns. The binning control unit 23 outputs a control signal to each of the plurality of pixel blocks 15 via corresponding one of a plurality of control lines L3. The binning control unit 23 outputs a control signal to each of the plurality of pixel blocks 16 via corresponding one of a plurality of control lines L4. The range and the number of pixels for binning illustrated in FIG. 5 are example, and are not limited to those described above.

Figures 6A, 6B:
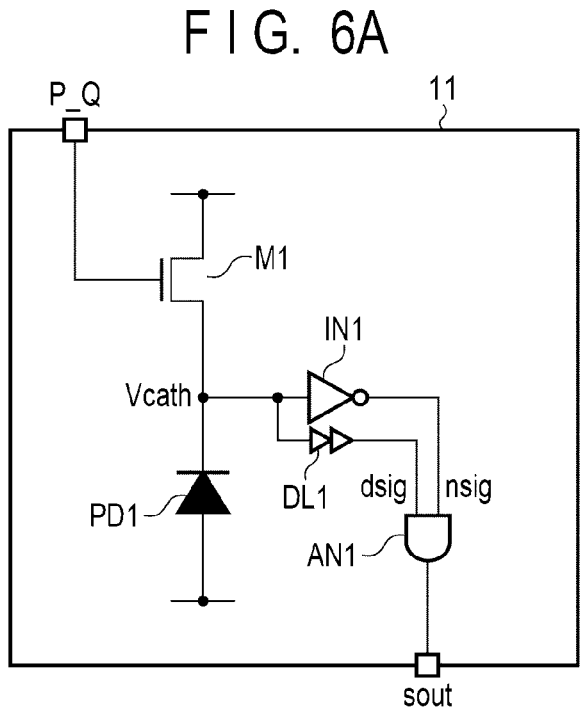
FIGS. 6A and 6B are diagrams illustrating a circuit and operation timings of a pixel according to the first embodiment, respectively.

FIG. 6A is a circuit diagram illustrating a circuit configuration example of the pixel 11. The pixel 11 includes an avalanche photodiode PD1, a transistor M1, an inverter IN1, a delay circuit DL1, and an AND circuit AN1. The transistor M1 may be an N-type MOS transistor.

The anode of the avalanche photodiode PD1 is connected to a potential line to which a first potential is supplied. The cathode of the avalanche photodiode PD1 is connected to the source of the transistor M1, an input terminal of the inverter IN1, and an input terminal of the delay circuit DL1. The drain of the transistor M1 is connected to a potential line to which a second potential is supplied. A control signal PQ is input from the control unit 21 to the gate of the transistor M1. An output terminal of the inverter IN1 is connected to a first input terminal of the AND circuit AN1, and an output terminal of the delay circuit DL1 is connected to a second input terminal of the AND circuit AN1.

The first potential and the second potential are set so that a reverse bias voltage is applied to the avalanche photodiode PD1. The reverse bias voltage is set so that the avalanche photodiode PD1 operates in the Geiger mode. The potential of the cathode of the avalanche photodiode PD1 is Vcath.

The inverter IN1 outputs a signal nsig obtained by inverting the logic level corresponding to the potential Vcath. The delay circuit DL1 outputs a signal dsig obtained by delaying Vcath by a predetermined time. The AND circuit AN1 outputs a logical conjunction of the signal nsig and the signal dsig as a signal sout.

FIG. 6B is a timing chart illustrating an operation timing of the pixel 11. FIG. 6B illustrates temporal changes of the control signal PQ, the potential Vcath, and the signals nsig, dsig, and sout. Circles with arrows illustrated between the row of the control signal PQ and the row of the potential Vcath indicates the timings of incidence of photons. The control signal PQ is a pulse signal that becomes high level at a constant period. The period of the control signal PQ is, for example, 20 ns. In this case, the frequency of the control signal PQ is 50 MHz.

At time tp1, when a photon is incident on the avalanche photodiode PD1, avalanche multiplication occurs and a current flows through the photodiode PD1. Thus, the potential Vcath decreases. At this time, the current stops at a certain potential due to the resistance of the transistor M1, and the voltage drop also stops (quenching operation). In this way, at the time tp1, the potential Vcath decreases from the original potential by a predetermined value. In response to the change in the potential Vcath, the signal nsig changes from the low level to the high level at the time tp1. After a predetermined delay time has elapsed from the time tp1, the signal dsig changes from the high level to the low level. Since the signal sout is the logical conjunction of the signal nsig and the signal dsig, the signal sout is a pulse wave which becomes the high level at the time tp1 and becomes the low level after the delay time has elapsed. Thus, when one photon is incident on the avalanche photodiode PD1, one pulse of the signal sout is generated. Further, by employing a circuit configuration for outputting the logical conjunction of the delay signal and the inverted signal, the pulse time width of the output signal can be reduced, and the accuracy of the detection time can be improved.

At time tr1, the control signal PQ changes from the low level to the high level. Accordingly, the transistor M1 is turned on, and the potential Vcath starts to rise. After that, after a predetermined time has elapsed, the potential Vcath returns to the potential before photon incidence. Thus, the avalanche photodiode PD1 is in a state in which a photon can be detected again. This operation is referred to as a recharging operation. At time tp2 at which the next photon is incident on the avalanche photodiode PD1, the recharging has completed, and the photon is detected in the same manner as at the time tp1. By repeatedly performing such a recharging operation, it is possible to repeatedly detect photons. Therefore, even if the signal arriving first after one light emission is a noise signal due to disturbance light, the possibility that a signal based on reflected light can be appropriately detected can be improved.

In the present embodiment, the transistor M1 is used as a quenching element for the avalanche photodiode PD1, thereby enabling the recharging operation according to the control signal PQ, but this configuration is not essential. For example, a resistor element having a predetermined resistance value may be arranged as the quenching element instead of the transistor M1.

Figure 7:
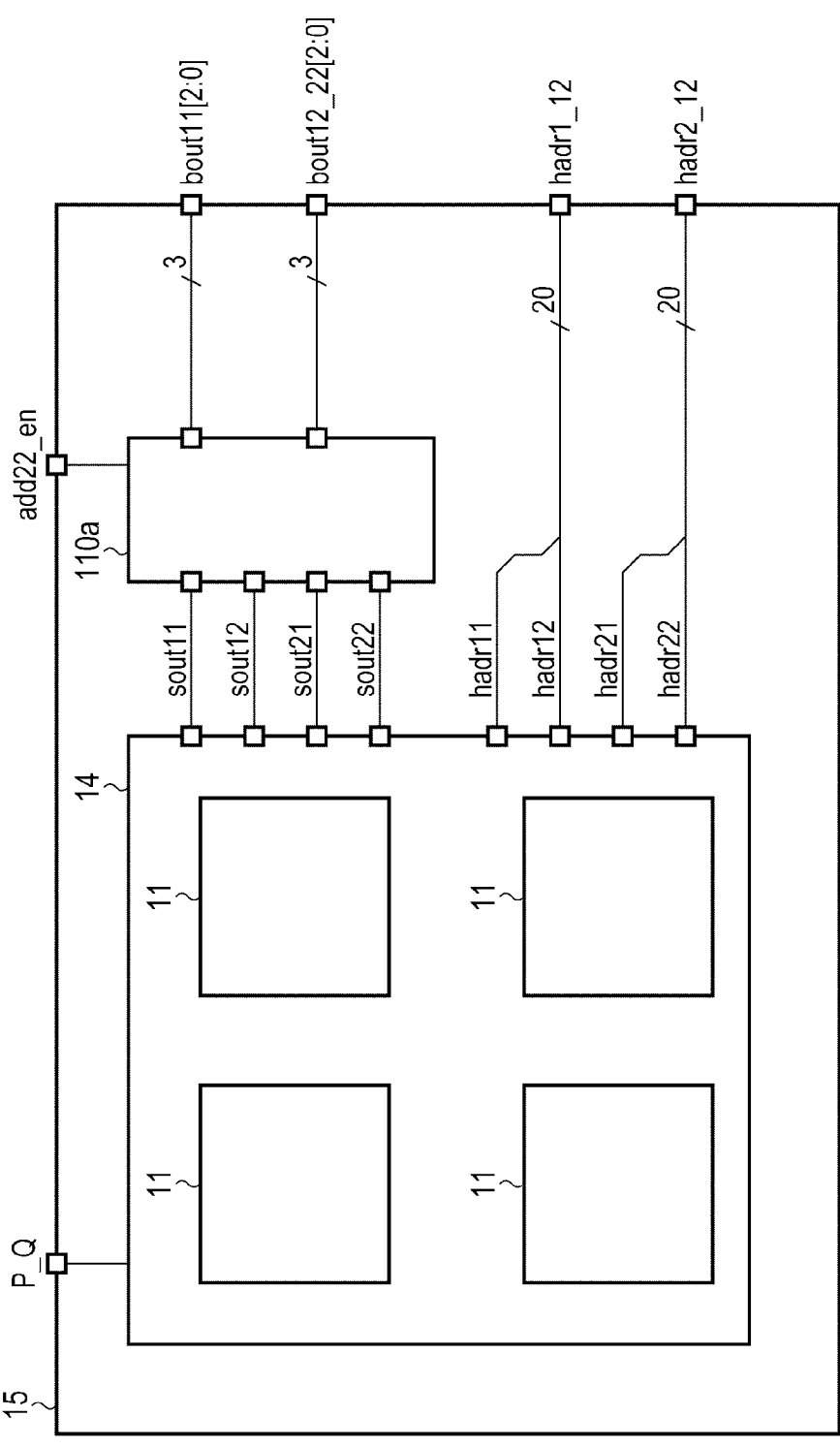
FIG. 7 is a diagram illustrating a configuration example of a pixel block according to the first embodiment.

Next, the 2×2 binning performed in the present embodiment will be described in detail with reference to FIGS. 7 to 10B. FIG. 7 is a diagram illustrating a configuration example of the pixel block 15 according to the present embodiment. FIG. 7 illustrates a configuration of one of the plurality of pixel blocks 15 illustrated in FIG. 5 in more detail. The pixel block 15 includes a pixel block 14 and a binning processing unit 110a. The binning processing unit 110a is a part of the binning processing unit 110 illustrated in FIG. 2. The pixel block 14 includes four pixels 11 arranged in two rows and two columns. The control signal PQ is input from the control unit 21 to the pixel block 14. A control signal add22_en is input from the binning control unit 23 to the binning processing unit 110a. The control signal add22_en is a signal for enabling the 2×2 binning.

FIG. 8 is a diagram illustrating a configuration example of the pixel block 14 according to the present embodiment. FIG. 8 illustrates a configuration of the pixel block 14 illustrated in FIG. 7 in more detail. The pixel block 14 includes four pixels 11 and four holding circuits 13. The four pixels 11 are arranged in two rows and two columns. The four holding circuits 13 are arranged so as to correspond to the four pixels 11, respectively. The common control signal PQ is input from the control unit 21 to the four pixels 11 and the four holding circuits 13. The labels "P11", "P12", "P21", and "P22" illustrated in FIG. 8 indicate the positions of the pixels 11. For example, in "P12", "1" of the second character means the first row, and "2" of the third character means the second row. The pixel 11 labeled "P11" outputs a signal sout11 to the binning processing unit 110a. The pixel 11 labeled "P12" outputs a signal sout12 to the binning processing unit 110a. The pixel 11 labeled "P21" outputs a signal sout21 to the binning processing unit 110a. The pixel 11 labeled "P22" outputs a signal sout22 to the binning processing unit 110a.

In addition, in the pixel block 14, a pixel horizontal address line 12 for supplying horizontal address data in the column direction to each pixel 11 is arranged corresponding to each column. The pixel horizontal address line 12 is a 10-bit bus and transmits a 10-bit digital signal indicating a corresponding column number.

The pixel horizontal address line 12 is connected to an input terminal of each holding circuit 13. The control signal PQ is input to a reset terminal of each holding circuit 13, and an output signal of corresponding pixel 11 is input to a trigger terminal of each holding circuit 13. When a pulse is input from the pixel 11 to the trigger terminal of the holding circuit 13, the holding circuit 13 holds the horizontal address data input from the pixel horizontal address line 12. When a pulse of the control signal PQ is input to the reset terminal of the holding circuit 13, the holding circuit 13 is reset. The holding circuit 13 corresponding to the pixel 11 labeled "P11" outputs horizontal address data hadr11. The holding circuit 13 corresponding to the pixel 11 labeled "P12" outputs horizontal address data hadr12. The holding circuit 13 corresponding to the pixel 11 labeled "P21" outputs horizontal address data hadr21. The holding circuit 13 corresponding to the pixel 11 labeled "P22" outputs horizontal address data hadr22. The numerical value given to the bus through which each signal is transmitted indicate the number of bits of the bus.

As illustrated in FIG. 7, the horizontal address data hadr11 and hadr12 in the first row are combined into one by a 20-bit bus and output from the pixel block 15 as horizontal address data hadr1_12. The horizontal address data hadr21 and hadr22 in the second row are combined into one by a 20-bit bus and output from the pixel block 15 as horizontal address data hadr2_12.

FIG. 9 is a diagram illustrating a configuration example of the binning processing unit 110a according to the present embodiment. The binning processing unit 110a includes addition circuits 111, 112, and 113 and a selector 114. The addition circuit 111 adds the signal sout11 and the signal sout12 and outputs the sum to the addition circuit 113. The addition circuit 112 adds the signal sout21 and the signal sout22 and outputs the sum to the addition circuit 113. The addition circuit 113 adds the output of the addition circuit 111 and the output of the addition circuit 112, and outputs the sum to the selector 114. That is, the output signal of the addition circuit 113 is obtained by adding the four signals sout11, sout12, sout21, and sout22. In this manner, the addition circuits 111, 112, and 113 perform binning processing of four pixels. The signal sout11 is also input to the selector 114.

The selector 114 is controlled by the control signal add22_en output from the binning control unit 23. When the control signal add22_en is at the high level (1), the selector 114 outputs the signal input from the addition circuit 113 as a signal bout11[2:0]. When the control signal add22_en is at the low level (0), the selector 114 outputs the signal sout11 as the signal bout11[2:0]. That is, the selector 114 outputs a signal in which binning of four pixels is performed when the control signal add22_en is at the high level (1), and outputs a signal in which binning is not performed when the control signal add22_en is at the low level (0). In this way, the selector 114 performs processing of switching between a state in which no binning is performed and a state in which the 2×2 binning is performed based on the control signal add22_en. Note that "[2:0]" added at the end of the signal name indicates that this signal is 3-bit data from the zeroth bit to the second bit. The notation of the number of bits such as "[2:0]" may be omitted.

The signals sout22, sout21, and sout12 are combined into one by a 3-bit bus and output from the binning processing unit 110a as a 3-bit signal bout12_22[2:0]. The least significant bit (LSB) of the signal bout12_22[2:0] is the signal bout12, and the most significant bit (MSB) thereof is the signal bout22. As illustrated in FIG. 9, the 3-bit signal bout12_22[2:0] may be expressed as "{bout22, bout21, bout12}".

FIGS. 10A and 10B are timing charts illustrating an operation of the pixel block 15 according to the present embodiment. FIG. 10A illustrates operation timings when the control signal add22_en is at the low level, that is, in a state without binning. FIG. 10B illustrates operation timings when the control signal add22_en is at the high level, that is, in a state in which the 2×2 binning is enabled.

In FIGS. 10A and 10B, circles with arrows in "P11", "P12", "P21" and "P22" indicate timings at which photons are incident on the corresponding pixels 11. FIGS. 10A and 10B illustrate the timings of the signals sout11 to sout22 and changes of the values of the horizontal address data hadr11 to hadr22. Further, in FIGS. 10A and 10B, the timing and value of the signal bout11[2:0] and the timings of the signals bout12_22[0], bout12_22[1], and bout12_22[2] are illustrated. Here, the signal bout12_22[0] is a value of the zeroth bit of the signal bout12_22[2:0], and corresponds to the signal sout12. The signal bout12_22[1] is a value of the first bit of the signal bout12_22[2:0], and corresponds to the signal sout21. The signal bout12_22[2] is a value of the second bit of the signal bout12_22[2:0], and corresponds to the signal sout22.

The operation in the state without binning will be described with reference to FIG. 10A. At time t1, a photon is incident on the pixel 11 labeled "P11". As a result, the signal sout11 becomes the high level, and the value of the horizontal address data hadr11 held in the holding circuit 13 becomes "0" by this pulse. The signal sout11 is output from the pixel block 15 as the signal bout11[2:0]. At this time, the value of bout11[2:0] is "1".

At time t2, the control signal PQ becomes the high level. As a result, the pixel 11 labeled "P11" is recharged, and is in a state in which a photon can be detected again. At the time t2, the value held in the holding circuit 13 is reset. At the time of resetting, all bits of the value of the address data are assumed to be "1". The state in which all bits are "1" is indicated as "all 1" in FIGS. 10A and 10B.

At time t3, photons are incident on the pixel 11 labeled "P12" and the pixel 11 labeled "P22". As a result, the signals sout12 and sout22 become the high level, and the values of the horizontal address data hadr12 and hadr22 held in the holding circuit 13 become "1" by these pulses. The signals sout12 and sout22 are output from the pixel block 15 as signals bout12_22[0] and bout12_22[2], respectively.

At time t4, a photon is incident on the pixel 11 labeled "P21". As a result, the signal sout21 becomes the high level, and the value of the horizontal address data hadr21 held in the holding circuit 13 becomes "0" by this pulse. The signal sout21 is output from the pixel block 15 as the signal bout12_22[1].

At time t5, photons are incident on the three pixels 11 labeled "P11", "P12", and "P22". As a result, the signals sout11, sout12, and sout22 become the high level. By these pulses, the value of the horizontal address data hadr11 held in the holding circuit 13 becomes "0". The values of the horizontal address data hadr12 and hadr22 become "1". The signals sout11, sout12, and sout22 are output from the pixel block 15 as signals bout11[2:0], bout12_22[0], and bout12_22[2], respectively. At this time, the value of bout11 [2:0] is "1".

Next, an operation in a state where the 2×2 binning is enabled will be described with reference to FIG. 10B. In FIG. 10B, the incident timing of each photon is assumed to be the same as that in FIG. 10A. In the description of FIG. 10B, a description of a portion common to the description of FIG. 10A is omitted.

The operation at times t1 and t2 is similar to that of FIG. 10A. At time t3, photons are incident on the pixel 11 labeled "P12" and the pixel 11 labeled "P22". As a result, the signals sout12 and sout22 become the high level, and the values of the horizontal address data hadr12 and hadr22 held in the holding circuit 13 become "1" by these pulses. The signals sout12 and sout22 are added in the binning processing unit 110*a* and output from the pixel block 15 as the signal bout11[2:0]. At this time, the value of the signal bout11[2:0] is "2", and it is detected that photons are incident on the two pixels 11. Further, the signals sout12 and sout22 are output from the pixel block 15 as signals bout12_22[0] and bout12_22[2], respectively.

At time t4, a photon is incident on the pixel 11 labeled "P21". As a result, the signal sout21 becomes the high level, and the value of the horizontal address data hadr21 held in the holding circuit 13 becomes "0" by this pulse. The signal sout21 is output from the pixel block 15 as the signal bout11[2:0]. At this time, the value of the signal bout11[2:0] is "1", and it is detected that a photon is incident on one pixel 11. Further, the signal sout21 is output from the pixel block 15 as the signal bout12_22[1].

At time t5, a photon is incident on the three pixels 11 labeled "P11", "P12", and "P22". As a result, the signals sout11, sout12, and sout22 become the high level. By these pulses, the value of the horizontal address data hadr11 held in the holding circuit 13 becomes "0". The values of the horizontal address data hadr12 and hadr22 become "1". The signals sout11, sout12, and sout22 are added in the binning processing unit 110*a* and output from the pixel block 15 as the signal bout11[2:0]. At this time, the value of the signal bout11[2:0] is "3", and it is detected that photons are incident on the three pixels 11. Further, the signals sout12 and sout22 are output from the pixel block 15 as signals bout12_22[0] and bout12_22[2], respectively.

In this manner, the pixel block 15 of the present embodiment can perform the binning processing of four pixels arranged in two rows and two columns by adding the signals in the binning processing unit 110*a*. As described above, the pixel block 15 can output a signal indicating the number of pixels 11 on which photons are incident among the four pixels 11 in the block.

Next, the 4×4 binning performed in the present embodiment will be described in detail with reference to FIGS. 11A to 15. FIGS. 11A and 11B are diagrams illustrating a configuration example of the pixel block 16 according to the present embodiment. FIGS. 11A and 11B illustrate four pixel blocks 16 in more detail. One pixel block 16 includes four pixel blocks 15 and a binning processing unit 110*b*. The binning processing unit 110*b* is a part of the binning processing unit 110 illustrated in FIG. 2. The four pixel blocks 15 are arranged in two rows and two columns. The control signal PQ from the control unit 21 and the control signal add22_en from the binning control unit 23 are input to the pixel block 15. A control signal add44_en from the binning control unit 23 is input to the binning processing unit 110*b*. The control signal add44_en enables the 4×4 binning.

Among the four pixel blocks 15, the upper left pixel block 15 outputs the signals bout11 and bout12_22 and the horizontal address data hadr1_12 and hadr2_12 as described with reference to FIG. 7. The other pixel blocks 15 have the same configuration as the pixel blocks 15 arranged on the upper left side. The other pixel blocks 15 are distinguished from each other by changing the numbers corresponding to the row numbers and column numbers included in the output signal names and the like. That is, the pixel block 15 arranged at the upper right outputs signals bout13 and bout13_24 and horizontal address data hadr1_34 and hadr2_34. The pixel block 15 arranged at the lower left outputs signals bout31 and bout31_42 and horizontal address data hadr3_12 and hadr4_12. The pixel block 15 arranged at the lower right outputs signals bout33 and bout33_44 and horizontal address data hadr3_34 and hadr4_34.

The signals bout11, bout13, bout31, and bout33 are input to the binning processing unit 110*b*. The signals bout12_22, bout13_24, bout31_42, and bout33_44 are combined into one by a 12-bit bus and output from the pixel block 16 as a 12-bit signal bout1×1_1144.

The horizontal address data hadr1_12 and hadr1_34 are combined into one by a 40-bit bus and output from the pixel block 16 as 40-bit horizontal address data hadr1_1234. The horizontal address data hadr2_12 and hadr2_34 are combined into one by a 40-bit bus and output from the pixel block 16 as 40-bit horizontal address data hadr2_1234. The horizontal address data hadr3_12 and hadr3_34 are combined into one by a 40-bit bus and output from the pixel block 16 as 40-bit horizontal address data hadr3_1234. The horizontal address data hadr4_12 and hadr4_34 are combined into one by a 40-bit bus and output from the pixel block 16 as 40-bit horizontal address data hadr4_1234.

FIG. 12 is a diagram illustrating a configuration example of the binning processing unit 110*b* according to the present embodiment. The binning processing unit 110*b* includes addition circuits 115, 116, and 117 and a selector 118. The addition circuit 115 adds the signal bout11[2:0] and the signal bout13[2:0], and outputs the sum to the addition circuit 117. The addition circuit 116 adds the signal bout31 [2:0] and the signal bout33[2:0], and outputs the sum to the addition circuit 117. The addition circuit 117 adds the output of the addition circuit 115 and the output of the addition circuit 116, and outputs the sum to the selector 118. That is, the output signal of the addition circuit 117 is obtained by adding four signals bout11[2:0], bout13[2:0], bout31[2:0], and bout33[2:0]. In this way, the addition circuits 115, 116, and 117 perform binning of the output signals of the four pixel blocks 15. Since the output of one pixel block 15 is the result of the binning processing of the output signals of the four pixels, it can be said that the addition circuits 115, 116, and 117 perform the binning processing of the output signals of the 16 pixels. The signal bout11[2:0] is also input to the selector 118.

The selector 118 is controlled by the control signal add44_en output from the binning control unit 23. When the control signal add44_en is at the high level (1), the selector 118 outputs the signal input from the addition circuit 117 as a signal bout_4×4_1144[4:0]. When the control signal add44_en is at the low level (0), the selector 118 outputs the signal bout11[2:0] as the signal bout_4×4_1144[4:0]. That is, the selector 118 outputs the binned signal of 16 pixels when the control signal add44_en is at the high level (1), and outputs the signal bout11[2:0] when the control signal add44_en is at the low level (0). In this way, the selector 118 performs processing of switching whether or not the 4×4 binning is performed based on the control signal add44_en.

The signals bout33[2:0], bout31[2:0], and bout13[2:0] are combined into one by a 9-bit bus and output as a 9-bit signal bout_2×2_1144[8:0]. As illustrated in FIG. 12, the 9-bit signal bout_2×2_1144[8:0] may be expressed as "{bout33 [2:0], bout31[2:0], bout13[2:0]}".

Referring back to FIGS. 11A and 11B, output of a signal from the pixel block 16 will be described. FIGS. 11A and 11B illustrate only two rows and two columns of pixel blocks 16. The upper left pixel block 16 outputs signals bout_4×4_1144, bout_2×2_1144, and bout_1×1_1144 and horizontal address data hadr1_1234, hadr2_1234, hadr3_1234, and hadr4_1234. The other pixel blocks 16 have the same configuration as the pixel blocks 16 arranged on the upper left. The other pixel blocks 16 are distinguished from each other by changing the numbers corresponding to the row numbers and column numbers included in the output signal names and the like. The upper right pixel block 16 outputs signals bout_4×4_1548, bout_2×2_1548, and bout_1×1_1548 and horizontal address data hadr1_5678, hadr2_5678, hadr3_5678, and hadr4_5678.

The plurality of pixel blocks 16 arranged in the same row outputs the same type of signals to a common signal line group arranged so as to extend in the row direction. That is, the signal bout_4×4_1144 and the signal bout_4×4_1548 are output to the same signal line, so that they are combined as a signal bout_4×4_v1v4 and output to the outside of the light receiving unit 10. The signal bout_2×2_1144 and the signal bout_2×2_1548 are output to the same signal line, so that they are combined as a signal bout_2×2_v1v4 and output to the outside of the light receiving unit 10. The signal bout_1× 1_1144 and the signal bout_1×1_1548 are output to the same signal line, so that they are combined as a signal bout_1× 1_v1v4 and output to the outside of the light receiving unit 10. Similarly, horizontal address data of the same row are combined and output as horizontal address data hadr_v1, hadr_v2, hadr_v3, and hadr_v4 to the outside of the light receiving unit 10.

In this manner, signals and the like in the same row are collectively output to a common signal line group, whereby the number of wirings can be reduced. When signals of the same row and the like are output in common as described above, although the signals are mixed when photons are simultaneously incident on different pixel blocks arranged in the same row, the probability of occurrence of such a case is low, and thus the influence on accuracy is small. Therefore, such a wiring structure in which signals of the same row are shared can be employed.

The lower left pixel block 16 and the lower right pixel block 16 illustrated in FIG. 11B have similar configurations, and detailed explanation thereof will be omitted. These pixel blocks 16 output signals bout_4×4_v5v8, bout_2×2_v5v8, and bout_1×1_v5v8 and horizontal address data hadr_v5, hadr_v6, hadr_v7, and hadr_v8 via a common signal line group.

FIG. 13 is a correspondence diagram of 4×4 binning processing according to the present embodiment. FIG. 13 schematically illustrates an arrangement of the pixels 11 in the upper left pixel block 16 in FIG. 11A and a correspondence relationship between output signals.

An output signal corresponding to the pixel 11 labeled "P11" is the signal bout_4×4_1144[4:0]. The signal bout_4× 4_1144[4:0] indicates the result of the 4×4 binning of the 16 pixels 11 in the pixel block 16. When the 4×4 binning is not enabled and the 2×2 binning is enabled, the output signal corresponding to the pixel 11 labeled "P11" is a signal indicating the results of the 2×2 binning of the four pixels 11 of "P11", "P12", "P21", and "P22". When none of the 4×4 binning and the 2×2 binning are enabled, the output signal corresponding to the pixel 11 labeled "P11" is a signal of the pixel 11 labeled "P11" alone.

An output signal corresponding to the pixel 11 labeled "P13" is a signal bout_2×2_1144[2:0]. The signal bout_2× 2_1144[2:0] indicates the result of the 2×2 binning of the four pixels 11 of "P13", "P14", "P23", and "P24". An output signal corresponding to the pixel 11 labeled "P31" is a signal bout_2×2_1144[5:3]. The signal bout_2×2_1144[5:3] indicates the result of the 2×2 binning of the four pixels 11 of "P31", "P32", "P41", and "P42". An output signal corresponding to the pixel 11 labeled "P33" is a signal bout_2× 2_1144[8:6]. The signal bout_2×2_1144[8:6] indicates the result of the 2×2 binning of the four pixels 11 of "P33", "P34", "P43", and "P44". When the 2×2 binning is not enabled, the output signals corresponding to the pixels 11 labeled "P13", "P31", and "P33" are signals of the pixels 11 labeled "P13", "P31", and "P33", respectively.

An output signal corresponding to the pixel 11 labeled "P12" is a signal bout_1×1_1144[0]. An output signal corresponding to the pixel 11 labeled "P21" is a signal bout_1× 1_1144[1]. The other pixels similarly have a correspondence relationship as illustrated in FIG. 13. Thus, the output signals corresponding to the pixels 11 other than the pixels 11 labeled "P11," "P13", "P31", and "P33" are signals of the corresponding pixels 11 alone regardless of whether or not binning is enabled.

FIGS. 14A and 14B are diagrams illustrating a configuration example of the time counting unit 22 and the time conversion unit 24 according to the present embodiment. The time counting unit 22 is, for example, an 11-bit counter that operates at 1 GHz. It is assumed that the time counting unit 22 can count from 0 to 2000. The count value COUNT output from the time counting unit 22 is input to the time conversion unit 24.

The time conversion unit 24 includes holding circuits 241, an OR circuit 242, selectors 243, 244, 245 and 246, and inverters IN2 and IN3. The count value COUNT, various signals such as the signal bout_4×4_v1v4[4:0] illustrated in FIG. 13, and the control signals add22_en and add44_en are input to the time conversion unit 24.

The configuration and operation of the time conversion unit 24 will be described for each input signal. The time conversion unit 24 includes the holding circuit 241 and the OR circuit 242 as processing circuits of the signal bout_4×4 v1v4[4:0] which is the result of 4×4 binning. The signal bout_4×4_v1v4[4:0] is input to the OR circuit 242. The OR circuit 242 is a logic circuit that outputs "1" when at least one of the values of each bit of the input multi-bit signal is "1", and outputs "0" when all the bits of the multi-bit signal are "0". Thereby, the OR circuit 242 converts the 5-bit signal into a 1-bit signal and outputs the 1-bit signal to a gate terminal of the holding circuit 241. The 1-bit signal indicates whether or not a photon is incident on at least one pixel 11 in the pixel block, and defines a holding timing in the holding circuit 241. The count value COUNT from the time counting unit 22 is input to a data input terminal of the holding circuit 241. Thereby, the holding circuit 241 holds the count value COUNT at the timing when at least one photon is detected in the corresponding pixel block, thereby performing time conversion. The output signal of the holding circuit 241 is output to the outside of the time conversion unit 24 as a signal tdc_out11[10:0]. The signal bout_4× 4_v1v4[4:0] is output to the outside as a signal num_out11 [4:0].

The time conversion unit 24 includes the holding circuit 241, the OR circuit 242, and the selectors 245 and 246 as processing circuits of the signal bout_2×2 v1v4[2:0] which is the result of 2×2 binning. Since the operations of the holding circuit 241 and the OR circuit 242 are substantially the same as those described above for the signal bout_4×4 v1v4[4:0], the description thereof will be omitted. A signal obtained by inverting the level of the control signal add44_en by the inverter IN3 is input to control terminals of the selectors 245 and 246. When the control signal add44_en is at the low level (when the 4×4 binning is disabled), the selector 245 outputs an output signal of the holding circuit 241 as a signal tdc_out13[10:0] to the outside of the time conversion unit 24. When the control signal add44_en is at the low level (when the 4×4 binning is disabled), the selector 246 outputs the signal bout_2×2_v1v4[2:0] to the outside of the time conversion unit 24 as a signal num_out13[2:0]. Further, when the control signal add44_en is at the high level (when the 4×4 binning is enabled), the selectors 245 and 246 output "0". In addition, when the control signal add44_en is at the high level, the time conversion of the result of the 2×2 binning is unnecessary, so that supply of power to the holding circuit 241 is stopped. This reduces power consumption.

The time conversion unit 24 includes the holding circuit 241 and the selectors 243 and 244 as processing circuits of the signal bout_1×1v1v4[0] output without binning from the pixel 11 labeled "P12". Since an operation of the holding circuit 241 is substantially the same as that described above for the signal bout_4×4_v1v4[4:0] except that the OR circuit 242 is omitted because the input signal is 1 bit, description thereof is omitted. A signal obtained by inverting the level of the control signal add22_en by the inverter IN2 is input to control terminals of the selectors 243 and 244. When the control signal add22_en is at the low level (when the 2×2 binning is disabled), the selector 243 outputs an output signal of the holding circuit 241 as a signal tdc_out12[10.0] to the outside of the time conversion unit 24. When the control signal add22_en is at the low level (when the 2×2 binning is disabled), the selector 244 outputs the signal bout_1×1_v1v4[0] to the outside of the time conversion unit 24 as a signal num_out12. Further, when the control signal add22_en is at the high level (when the 2×2 binning is enabled), the selectors 243 and 244 output "0". In addition, when the control signal add22_en is at the high level, the time conversion of the signal without binning is unnecessary, so that power supply to the holding circuit 241 is stopped. This reduces power consumption.

Since the circuits corresponding to the other input signals are the same as any of the above-described circuits, the description thereof will be omitted. As described above, the signal output from the time conversion unit 24 is stored for each pixel in the frequency distribution holding unit 26 together with the address output from the address control unit 25, and is used for generation of the frequency distribution.

Figure 15:
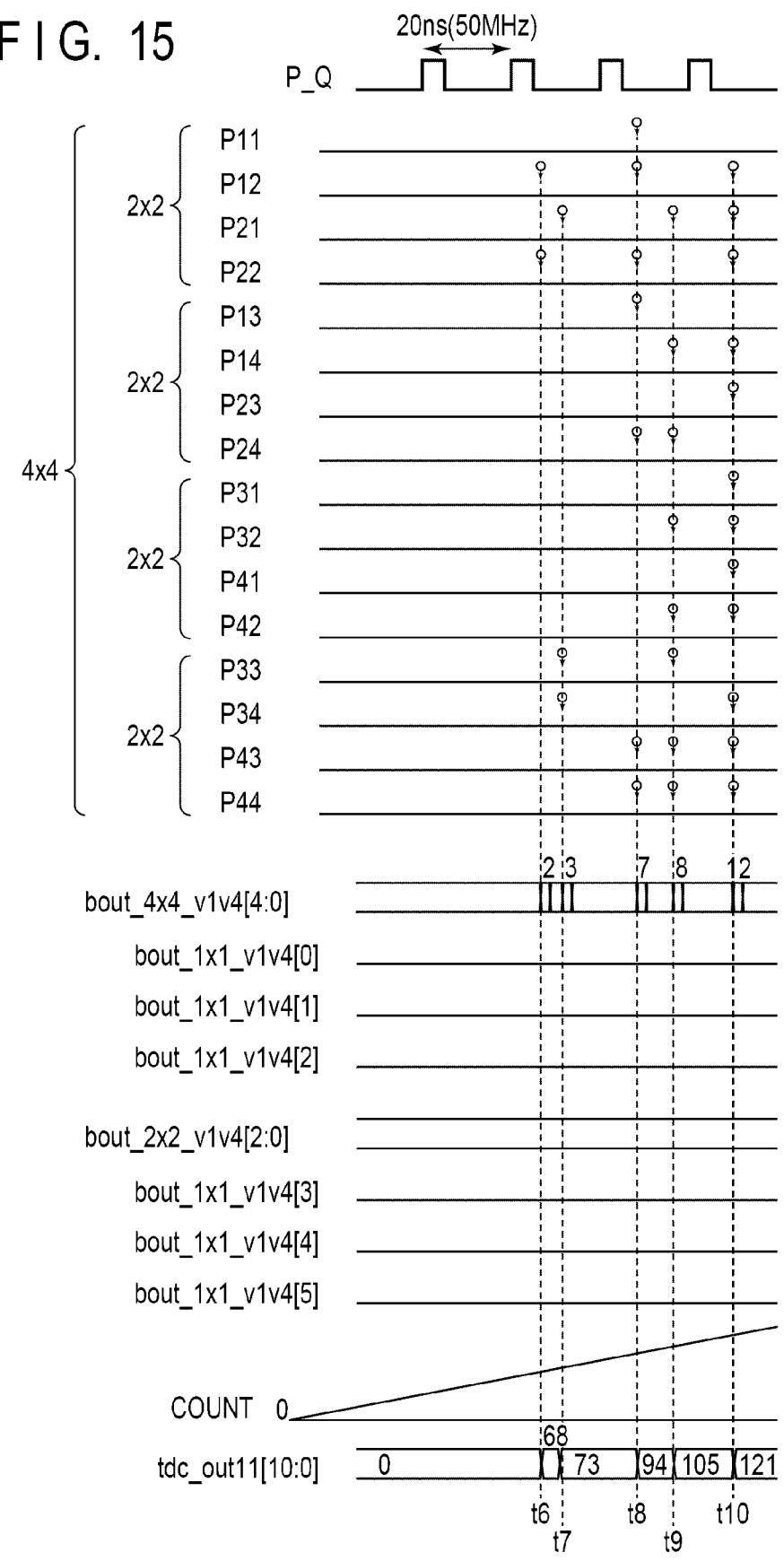
FIG. 15 is a timing chart illustrating an operation of the pixel block according to the first embodiment.

FIG. 15 is a timing chart illustrating an operation of the pixel block 16 according to the present embodiment. FIG. 15 illustrates an outline of signal acquisition and time conversion when the 4×4 binning processing is performed (that is, when both of the control signals add22_en and add44_en are at the high level). In the description of FIG. 15, the description of elements common to those of FIGS. 10A and 10B may be omitted or simplified.

In FIG. 15, circles with arrows in "P11" to "P44" indicate timings at which photons are incident on the corresponding pixels 11. In FIG. 15, "bout_4×4_v1v4[4:0]", "bout_2×2 v1v4[2:0]", and "bout_1×1 v1v4[0] to [5]" indicate timings and values of these signals. In FIG. 15, "COUNT" denotes a count value output from the time counting unit 22, and "tdc_out11[10:0]" denotes a value after time conversion output from the time conversion unit 24.

At time t6, photons are incident on the two pixels 11 labeled "P11" and "P22". Thereby, the value "2" of the signal bout_4×4_v1v4[4:0] is output. The value of the signal tdc_out11[10:0] becomes the count value "68" corresponding to the time t6.

At time t7, photons are incident on the three pixels 11 labeled "P21", "P33", and "P34". Thereby, the value "3" of the signal bout_4×4_v1v4[4:0] is output. The value of the signal tdc_out11[10:0] becomes the count value "73" corresponding to the time t7.

At time t8, photons are incident on the seven pixels 11 labeled "P11", "P12", "P22", "P13", "P24", "P43", and "P44". Thereby, the value "7" of the signal bout_4×4 v1v4[4:0] is output. The value of the signal tdc_out11[10:0] becomes the count value "94" corresponding to the time t8.

At time t9, photons are incident on the eight pixels 11 labeled "P21", "P14", "P24", "P32", "P42", "P33", "P43", and "P44". Thereby, the value "8" of the signal bout_4×4 v1v4[4:0] is output. The value of the signal tdc_out11[10:0] becomes the count value "105" corresponding to the time t9.

At time t10, photons are incident on the twelve pixels 11 labeled "P12", "P21", "P22", "P14", "P23", "P31", "P32", "P41", "P42", "P34", "P43", and "P44". Thereby, the value "12" of the signal bout_4×4_v1v4[4:0] is output. The value of the signal tdc_out11[10:0] becomes the count value "121" corresponding to the time t10.

As described above, when the 4×4 binning processing is performed, the selectors 243, 244, 245, and 246 output "0". Therefore, the signals bout_2×2_v1v4[2:0] and bout_1× 1_v1v4[0] to [5] are at the low level over the entire period from the time t6 to the time t10. Accordingly, all of the values of the time-converted signals other than tdc_out11 [10.0] (for example, tdc_out12[10:0]) are "0".

Figure 16:
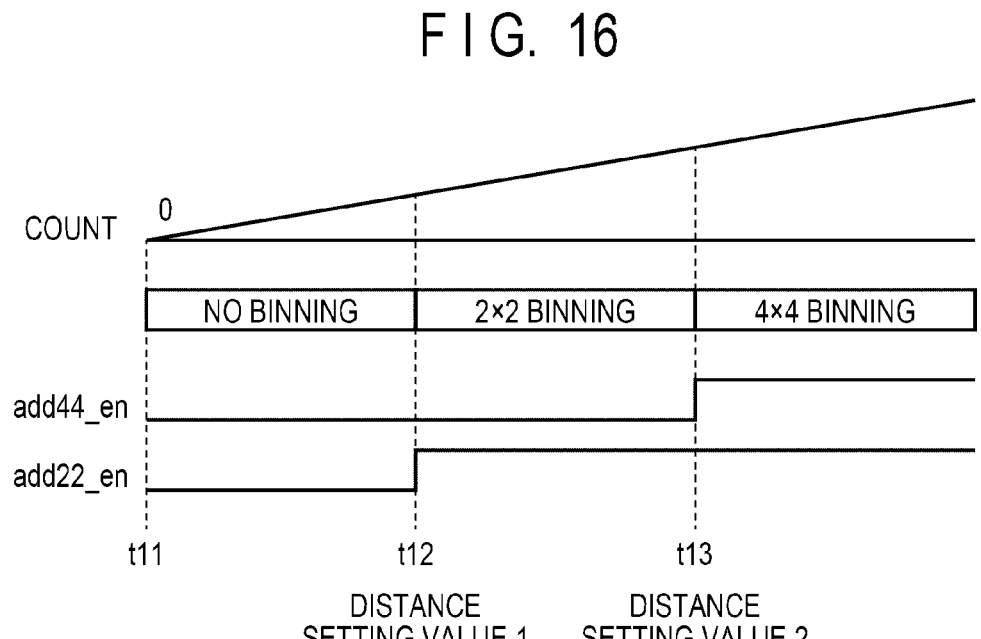
FIG. 16 is a timing chart illustrating an operation of a binning control unit according to the first embodiment.

FIG. 16 is a timing chart illustrating an operation of the binning control unit 23 according to the present embodiment. As described above, in the present embodiment, according to the control signals add22_en and add44_en output from the binning control unit 23, three types of settings of no binning (first mode), the 2×2 binning (second mode), and the 4×4 binning (third mode) can be switched. In the setting of no binning (first mode), a signal based on incident light to one (first number) pixel 11 is output. In the setting of 2×2 binning (second mode), a signal based on incident light to four (second number) pixels 11 are output. In the setting of 4×4 binning (third mode), a signal based on incident light to 16 (third number) pixels 11 is output. FIG. 16 illustrates an example of a method of switching these settings in one shot period (period from the start of light emission to the next start of light emission of the light emitting device 3). FIG. 16 illustrates the count value COUNT output from the time counting unit 22, the setting of the binning condition, and the control signals add22_en and add44_en.

Note that, as illustrated in FIG. 5, for the above three kinds of settings corresponding to one frequency distribution, the four pixels 11 in which the 2×2 binning is performed include one pixel 11 in a setting of no binning. Further, as illustrated in FIG. 5, for the above three kinds of settings corresponding to one frequency distribution, the 16 pixels 11 in which the 4×4 binning is performed include all of the four pixels 11 in which the 2×2 binning is performed. In this way, by switching the settings so that the pixels 11 in the binning setting in the narrower range are included in the binning setting in the wider range, the same pixels 11 can be included in the binning range in each setting.

Time t11 is a light emission timing of the light emitting unit 30, and the time counting unit 22 starts time counting. In other words, the time t11 is the start timing of one shot period. At the time t11, both of the control signals add22_en and add44_en are at the low level. That is, the signal output is performed under the condition of no binning. Therefore, during a period from the time t11 to time t12, the time conversion unit 24 individually outputs a signal based on the incident photon for each pixel 11.

The time t12 is a time at which the count value COUNT coincides with the "distance setting value 1" that is set in advance from the outside. The binning control unit 23 switches the control signal add22_en from the low level to the high level at the timing at which the count value COUNT coincides with the "distance setting value 1". Thereby, at the time t12, the state in which the signal output is performed under the condition of no binning is changed to the state in which the signal output is performed under the condition of 2×2 binning. Accordingly, during a period from the time t12 to time t13, the time conversion unit 24 collectively outputs signals based on photons incident on the four pixels 11 in the pixel block 15 as one signal.

The time t13 is a time at which the count value COUNT coincides with the "distance setting value 2" that is set in advance from the outside. The binning control unit 23 switches the control signal add44_en from the low level to the high level at the timing at which the count value COUNT coincides with the "distance setting value 2". Thereby, the state in which the signal output is performed under the condition of 2×2 binning is changed to the state in which the signal output is performed under the condition of 4×4 binning. Accordingly, in the period after the time t13, the time conversion unit 24 collectively outputs signals based on photons incident on the 16 pixels 11 in the pixel block 16 as one signal.

The frequency distribution held in the frequency distribution holding unit 26 for each pixel 11 will be described. As described with reference to FIGS. 4A to 4D, the frequency distribution is data in which the time count value and the number of detected photons are associated with each other. When the frequency distribution is illustrated by the histograms illustrated in FIGS. 4A to 4D, the horizontal axis represents the time count value and the vertical axis represents the number of detected photons. For example, it is assumed that the frequency of the time counting operation in the time counting unit 22 is 1 GHz, that is, the period is 1 ns, and the light emission interval of the light emitting unit 30 is 2 μs. In this case, the upper limit of the time count value is 2000. Performing the 4×4 binning may require holding up to 16 counts of the number of photons in one light emission for one pixel block. Assuming that the number of times of light emission is 4,000, since the maximum value of the number of detected photons corresponding to one time count value is 16 counts×4000 times=64000, the number of bits required for one time count value is 16 bits. The frequency distribution holding unit 26 may have a memory capacity sufficient to hold this.

In the above-described example, in the time count values corresponding to the horizontal axis of the histogram, one time count value corresponds to one class, but the correspondence is not limited thereto. For example, a plurality of time count values such as 4 counts and 8 counts may be grouped into one class to increase the class width to reduce the memory capacity. In this case, since the number of detected photons at a plurality of time count values is added, the peak detection accuracy of the number of detected photons is improved. On the other hand, since the distance resolution decreases in this method, it is desirable to appropriately set the number of time count values corresponding to one class according to the required specification.

The above-described frequency distribution is generated for each pixel 11. Control related to the address of the pixel 11 is performed by the address control unit 25. As described above, in the settings of no binning, the 2×2 binning, and the 4×4 binning, the output signals from some of the pixels 11 may be fixed to "0". With respect to the pixel from which "0" is output, the binned signal may be copied and held in the memory. For example, in "P11" to "P44" in FIG. 13, the 4×4 binning result is output as a signal corresponding to the pixel 11 labeled "P11". In this case, although the output signals corresponding to the other pixels 11 such as "P12" and "P44" are "0", but data indicating the result of 4×4 binning of "P11" is copied and held in the memories corresponding to these pixels 11 instead of "0". By copying and holding the binned signals in the memories of a plurality of pixels used for binning, data that does not reflect actual incident light such as fixed value "0" can be prevented from remaining. As a result, even if the binning condition is changed in the middle of one shot period, the frequency distribution of all the pixels can be generated, so that signal processing using the frequency distribution can be easily performed.

In the binning processing according to the present embodiment, the binning processing unit 110*a* illustrated in FIG. 9 and the binning processing unit 110*b* illustrated in FIG. 12 are exemplified in which signals from a plurality of pixels are added and integrated into a multi-bit signal, but the integration method of signals is not limited thereto. For example, a binning processing may be adopted in which a 1-bit signal is output when photons are incident on some of the four pixels (for example, three or more pixels) in one pixel block 15. An example of a circuit that outputs the 1-bit signal when photons are incident on three or more pixels out of four pixels is a so-called majority circuit. An example of the majority circuit is a circuit including a plurality of AND circuits to which signals of any combination of three pixels among four pixels are input and an OR circuit to which output signals of these AND circuits are input. According to this configuration, since the output signal obtained by integrating the signals from the plurality of pixels is a 1-bit signal, the capacity of the memory required for holding the frequency distribution can be reduced.

According to the present embodiment, the binning setting can be switched within one shot period from the start of light emission of the light emitting unit 30 to the next start of light emission of the light emitting unit 30. This switching includes switching the presence or absence of binning such as switching from the setting of no binning to the setting of 2×2 binning, and switching the binning range such as switching from the setting of 2×2 binning to the setting of 4×4 binning. In other words, the number of pixels 11 corresponding to one output signal is switched within one shot period. By switching the setting of the binning, both the short distance and the long distance can be measured with appropriate accuracy in the ranging of one frame. Therefore, according to the present embodiment, a ranging device and a driving method of the ranging device with improved followability are provided.

Second Embodiment

The present embodiment is an example in which the distance setting value 1 and the distance setting value 2 described with reference to FIG. 16 are dynamically changed in units of shot periods. Further, in the present embodiment, an example in which a threshold value of the peak detection when calculating the distance from the frequency distribution is dynamically changed is also described. In the present embodiment, descriptions of portions common to those of the first embodiment may be omitted or simplified.

FIG. 17 is a diagram illustrating operation timings of ranging according to the present embodiment. FIGS. 18A to 18D are histograms illustrating an outline of the processing according to the present embodiment. Parameters used in the flowchart of FIG. 17 will be described. The "SN" is a loop counter variable indicating the number of shots (the number of times of light emission of the light emitting unit 30) in one frequency distribution generation. The "hdcnt" is a loop counter variable indicating the total number of shots within one frame period. The "Z" is a loop counter variable indicating the number of shifts of the distance setting value. The "HT0", "HT1", and "HT2" are threshold values for determining the number of detected photons when the distance calculation unit 27 performs peak determination. The "K1" and "K2" are distance setting values corresponding to the distance setting value 1 and the distance setting value 2 illustrated in FIG. 16, respectively. The "shot number setting value" is a setting value of the number of shots in one frequency distribution generation. The initial values of "SN", "hdcnt", and "Z" are "0".

Hereinafter, with reference to FIGS. 18A to 18D as appropriate, the ranging processing will be described in accordance with the flowchart of FIG. 17. FIG. 17 illustrates a ranging processing performed in one frame period.

In step S1, the control unit 21 outputs an initialization signal to each block to initialize the distance setting values K1 and K2, the determination threshold values HT0, HT1, and HT2, and the shot number setting values. It is assumed that the initial values of the distance setting values K1 and K2 are "63" and "95", respectively. It is assumed that the initial value of the shot number setting value is "4". The determination threshold value HT0 is a threshold value applied during a period in which the time count value is from zero to K1 (that is, a period during which no binning is performed). The determination threshold value HT1 is a threshold value applied during a period in which the time count value is from K1 to K2 (that is, a period during which the 2×2 binning is performed). The determination threshold value HT2 is a threshold value applied during a period in which the time count value is greater than K2 (that is, a period during which the 4×4 binning is performed). It is assumed that the initial values of the determination threshold values HT0, HT1, and HT2 are "30", "20", and "10", respectively.

In step S2, the light emitting unit 30 emits light based on a control signal from the control unit 21. Further, the control unit 21 increments the loop counter variables SN and hdcnt (increases these values by 1).

In step S3, the incident light is detected in the light receiving unit 10 by the same processing as described in the first embodiment, and the number of detected photons held in the frequency distribution holding unit 26 is updated. Thereby, the frequency distribution is generated.

In step S4, the control unit 21 determines whether or not the loop counter variable SN is less than the shot number setting value. When the loop counter variable SN is less than the shot number setting value (YES in the step S4), the process proceeds to the step S2, and the process in the next shot period is performed. When the loop counter variable SN is equal to or greater than the shot number setting value (NO in the step S4), the process proceeds to step S5. In the initial setting, the process from the step S2 to the step S4 is repeated four times.

In the step S5, the distance calculation unit 27 determines the presence or absence of a peak from the frequency distribution based on the distance setting value and the determination threshold value. As described above, the time count value corresponding to the peak of the frequency distribution is the distance information between the ranging device 1 and the object X. With reference to the histogram of FIG. 18A, an outline of the peak detection processing will be described. The horizontal axis of the histogram is the time indicated by the time count value, and the vertical axis of the histogram is the number of detected photons. The determination threshold values HT0, HT1, and HT2 are indicated in the vertical axis, and the distance setting values K1 and K2 are indicated in the horizontal axis. As described above, the determination threshold value HT0 is applied in the range from zero to K1, the determination threshold value HT1 is applied in the range from K1 to K2, and the determination threshold value HT2 is applied in the range greater than K2. In the example of the histogram illustrated in FIG. 18A, when the determination threshold value and the number of photons are compared in each region, since there is no bin exceeding the determination threshold value, the distance calculation unit 27 determines that a peak cannot be detected.

When a peak is detected in the step S5 (YES in the step S5), the process proceeds to step S13. When no peak is detected in the step S5 (NO in the step S5), the process proceeds to step S6.

Data processing may be performed in the above-described peak detection processing. For example, the noise around the peak may be removed by applying a filter such as a median filter, or the peak may be detected by converting the time of the frequency distribution into a frequency by applying a discrete Fourier transform (DFT). When such data processing is performed, the determination threshold value can be appropriately changed to a value suitable for the algorithm.

In the step S13, the distance calculation unit 27 calculates distance information indicating the distance from the ranging device 1 to the object X by converting the time corresponding to the detected peak into a distance. Then, the output unit 28 outputs the distance information to the outside of the ranging device 1.

In the step S6, the distance calculation unit 27 reduces the determination threshold values HT0, HT1, and HT2. This facilitates detection of a peak in the subsequent peak detection processing in step S7. As illustrated in FIG. 17, this processing may, for example, decrease the determination threshold value HT0 by 10, decrease the determination threshold value HT1 by 5, and decrease the determination threshold value HT2 by 2. Thus, the determination threshold values HT0, HT1, and HT2 can be changed based on the calculation result of the distance information in the distance calculation unit 27.

In the step S7, peak detection is performed by the same processing as in the step S5. With reference to the histogram of FIG. 18B, an outline of the determination threshold processing in the steps S6 and S7 will be described. In FIG. 18B, the determination threshold values HT0, HT1, and HT2 are lower than those in FIG. 18A. In the example of the histogram illustrated in FIG. 18B, since there is no bin exceeding the determination threshold value, the distance calculation unit 27 determines that the peak cannot be detected.

When a peak is detected in the step S7 (YES in the step S7), the process proceeds to the step S13. When no peak is detected in the step S7 (NO in the step S7), the process proceeds to step S8.

In the processing of the steps S6 and S7, there is a possibility that the influence of noise due to external light becomes large by lowering the determination threshold values. Therefore, in the case of using the filter for noise removal as described above, the filter coefficients may be made different between the peak detection in the step S5 and the peak detection in the step S7. Further, processing of detecting whether or not the peak is due to noise may be added using the difference between the level of the peak exceeding the threshold value and the level of the bin around the peak as an index.

In the step S8, the binning control unit 23 reduces the distance setting values K1 and K2. As a result, the timings of switching to the 2×2 binning and the 4×4 binning in the subsequent shot becomes early, and a peak can be easily detected. As illustrated in FIG. 17, this processing may, for example, decrease the distance setting value K1 by 20 and decrease the distance setting value K2 by 10. The histogram of FIG. 18C schematically illustrates an example in which the distance setting values K1 and K2 are reduced. As compared with the case of FIG. 18B, the distance setting value K1 decreases from "63" to "43", and the distance setting value K2 decreases from "95" to "85". Thus, the distance setting values K1 and K2 can be changed based on the calculation result of the distance information in the distance calculation unit 27.

In step S9, the control unit 21 increments the loop counter variable Z (increases the value by 1).

In step S10, the control unit 21 determines whether or not the loop counter variable Z is one. When the loop counter variable Z is one (YES in the step S10), the process proceeds to step S11. When the loop counter variable Z is other than one (NO in the step S10), the process proceeds to the step S2. In the example of the present embodiment, since Z=1 in the step S10, the process proceeds to the step S11.

In the step S11, the control unit 21 increases the shot number setting value twice. Since the shot number setting value is four in the initial setting, the shot number setting value is increased to eight in this case. In the step S11, the control unit 21 resets the loop counter variables SN and Z to zero. In this way, based on the calculation result of the distance information in the distance calculation unit 27, the shot number setting value corresponding to the number of accumulation of the incident light amounts can be changed.

In step S12, the control unit 21 determines whether or not the loop counter variable hdcnt is less than 8000. This determination processing is processing for terminating the process when no peak is detected within one frame period. Assuming that the length of one shot period is 2 s, the length of one frame period is about 16 ms, and the number of shots is about 8000. Therefore, in the step S12, a determination is performed for an operation that when the number of shots performed within one frame period is 8000 or more, the process is terminated, and otherwise, to the process is continued. That is, when the loop counter variable hdcnt is less than 8000 (YES in the step S12), the process proceeds to the step S2. When the loop counter variable hdcnt is equal to or greater than 8000 (NO in the step S12), the process in this frame period ends.

When the process proceeds from the step S12 to the step S2, since the shot number setting value is set to 8 in the next step S4, the process from the step S2 to the step S4 is repeated eight times. When a peak can be detected from obtained frequency distribution, distance information is output in the step S13. The histogram of FIG. 18D schematically illustrates an example of peak detection when the shot number setting value is increased. In the example of FIG. 18D, the number of detected photons is increased compared to the examples of FIGS. 18A to 18C. In this example, the number of detected photons in some bins exceeds the threshold valued and peak detection is possible. When the peak cannot be detected from the frequency distribution of eight shots, the determination threshold value and the distance setting value are reduced again, and the peak detection is performed again in a state in which the shot number setting value is doubled to 16.

In the present embodiment, the determination value in the step S10 is set to "1", but the determination value is not limited thereto. Further, the determination value may be dynamically changed. For example, when the shot number setting value exceeds a predetermined threshold value, the determination value in the step S10 may be set to a value greater than "1". In this case, peak detection is performed after shifting the distance setting values K1 and K2 and before increasing the shot number setting value.

The numerical values of the initial values, the amounts of change, and the like of the parameters described in the present embodiment are merely examples for embodying the description, and are not limited thereto. The initial value and the amount of change can be appropriately set based on various factors such as the time and location at which the ranging is performed, the surrounding environment, the color of the object, and the shape of the object. For example, in the present embodiment, the initial value of the shot number setting value is set to "4", but the initial value may be "1".

As described above, also in the present embodiment, similarly to the first embodiment, the ranging device and the driving method of the ranging device with improved followability are provided. Further, in the present embodiment, the peak detection can be more effectively performed by changing the setting of the distance setting value at which the binning setting is switched, on a shot-by-shot basis. Further, in the present embodiment, peak detection can be more effectively performed by further changing the determination threshold value for peak detection or the number of shots.

Third Embodiment

The present embodiment is an example in which the distance setting value 1 and the distance setting value 2 described with reference to FIG. 16 are set to different values among the regions divided in the vertical direction of the light receiving unit 10. In the present embodiment, a description of a portion common to the first embodiment or the second embodiment may be omitted or simplified.

Figure 19:
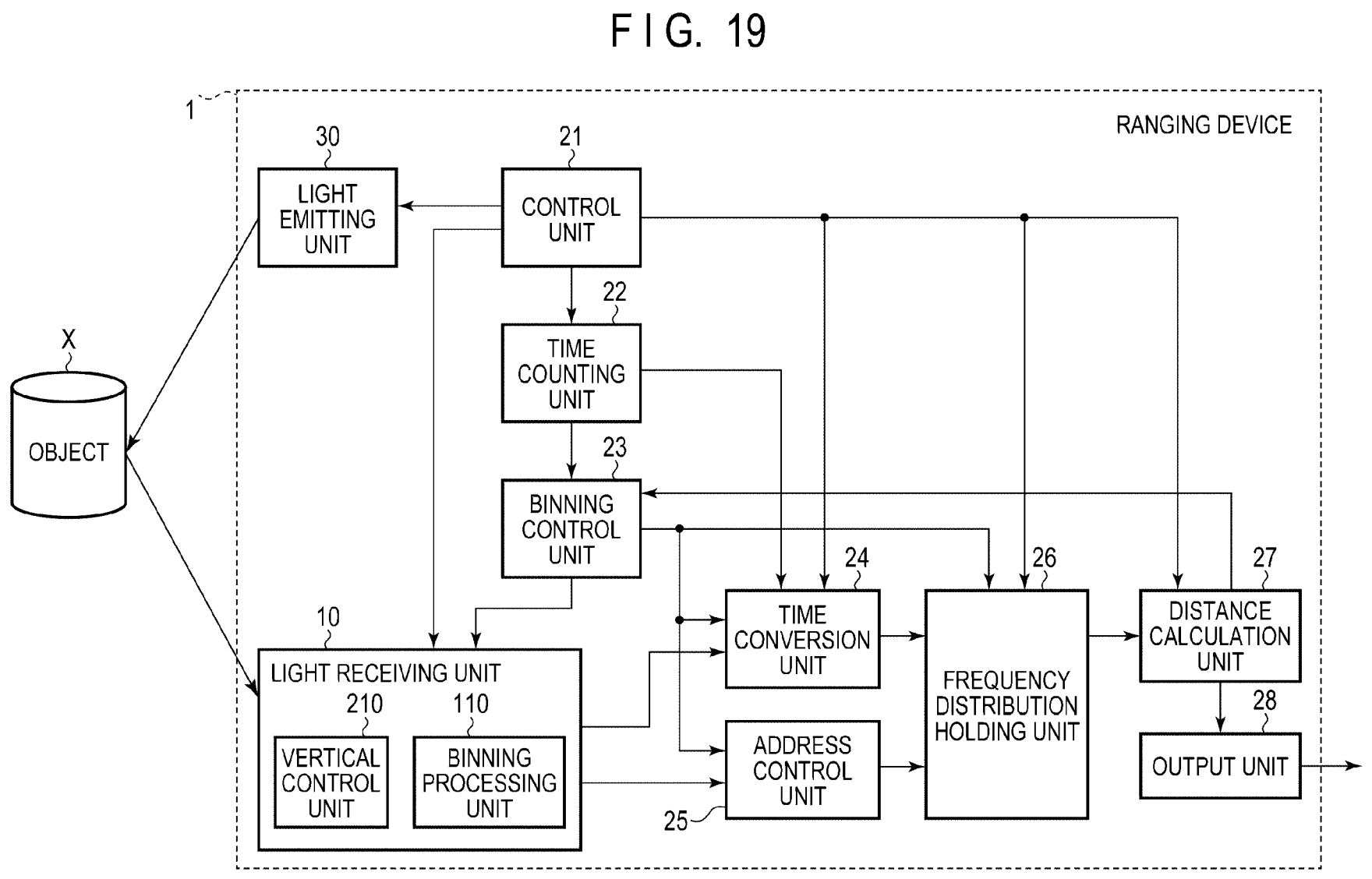

FIG. 19 is a functional block diagram illustrating a schematic configuration example of the ranging device 1 according to the third embodiment. The light receiving unit 10 of the present embodiment further includes a vertical control unit 210 in addition to the configuration described in the first embodiment. The vertical control unit 210 acquires position information of the region division in the vertical direction from the control unit 21, and generates a control signal to be supplied to the pixels of each region based on the position information and a control signal from the binning control unit 23. Elements other than the vertical control unit 210 are the same as those in the first embodiment, and thus description thereof is omitted.

FIG. 20 is a diagram illustrating a configuration example of the vertical control unit 210 according to the present embodiment. FIG. 20 illustrates a vertical control unit 210 and a plurality of pixel blocks 16. In FIG. 20, four rows and four columns of pixel blocks 16 are arranged for simplicity of explanation, but the number of rows and the number of columns of the pixel blocks 16 can be changed as appropriate. The plurality of pixel blocks 16 are divided into a region 1 (first region) and a region 2 (second region). The upper two rows of pixel blocks 16 are arranged in the region 1, and the lower two rows of pixel blocks 16 are arranged in the region 2. The vertical control unit 210 includes selectors 211, 212, 213, 214, 215, 216, 217, and 218. The selectors 211 and 212 are arranged corresponding to the first row of the region 1. The selectors 213 and 214 are arranged corresponding to the second row of the region 1. The selectors 215 and 216 are arranged corresponding to the first row of the region 2. The selectors 217 and 218 are arranged corresponding to the second row of the region 2.

The control unit 21 outputs the setting value of the region 1 and the setting value of the region 2 to the vertical control unit 210. The setting value of the region 1 is input to control terminals of the selectors 211, 212, 213, and 214, and the setting value of the region 2 is input to control terminals of the selectors 215, 216, 217, and 218. The binning control unit 23 outputs control signals add22_en1, add22_en2, add44_en1, and add44_en2 to the vertical control unit 210. The control signals add22_en1 and add22_en2 are input to input terminals of the selectors 211, 213, 215, and 217. The control signals add44_en1 and add44_en2 are input to input terminals of the selectors 212, 214, 216, and 218.

In the present embodiment, it is assumed that the setting value of the region 1 is "0" and the setting value of the region 2 is "1". In this case, the selector 211 selects the control signal add22_en2 and outputs the selected signal as a control signal add22_v0 to the pixel block 16 in the first row of the region 1. The selector 212 selects the control signal add44_en2 and outputs the selected signal as a control signal add44_v0 to the pixel block 16 in the first row of the region 1. The selector 213 selects the control signal add22_en2 and outputs the selected signal as a control signal add22_v1 to the pixel block 16 in the second row of the region 1. The selector 214 selects the control signal add44_en2 and outputs the selected signal as a control signal add44_v1 to the pixel block 16 in the second row of the region 1.

The selector 215 selects the control signal add22_en1 and outputs the selected signal as a control signal add22_v2 to the pixel block 16 in the first row of the region 2. The selector 216 selects the control signal add44_en1 and outputs the selected signal as a control signal add44_v2 to the pixel block 16 in the first row of the region 2. The selector 217 selects the control signal add22_en1 and outputs the selected signal as a control signal add22_v3 to the pixel block 16 in the second row of the region 2. The selector 218 selects the control signal add44_en1 and outputs the selected signal as a control signal add44_v3 to the pixel block 16 in the second row of the region 2.

Thus, the vertical control unit 210 has a function of inputting different distance setting values to the upper region 1 and the lower region 2 of the light receiving unit 10. Thus, binning with different settings may performed between the region 1 and the region 2.

Figure 21:
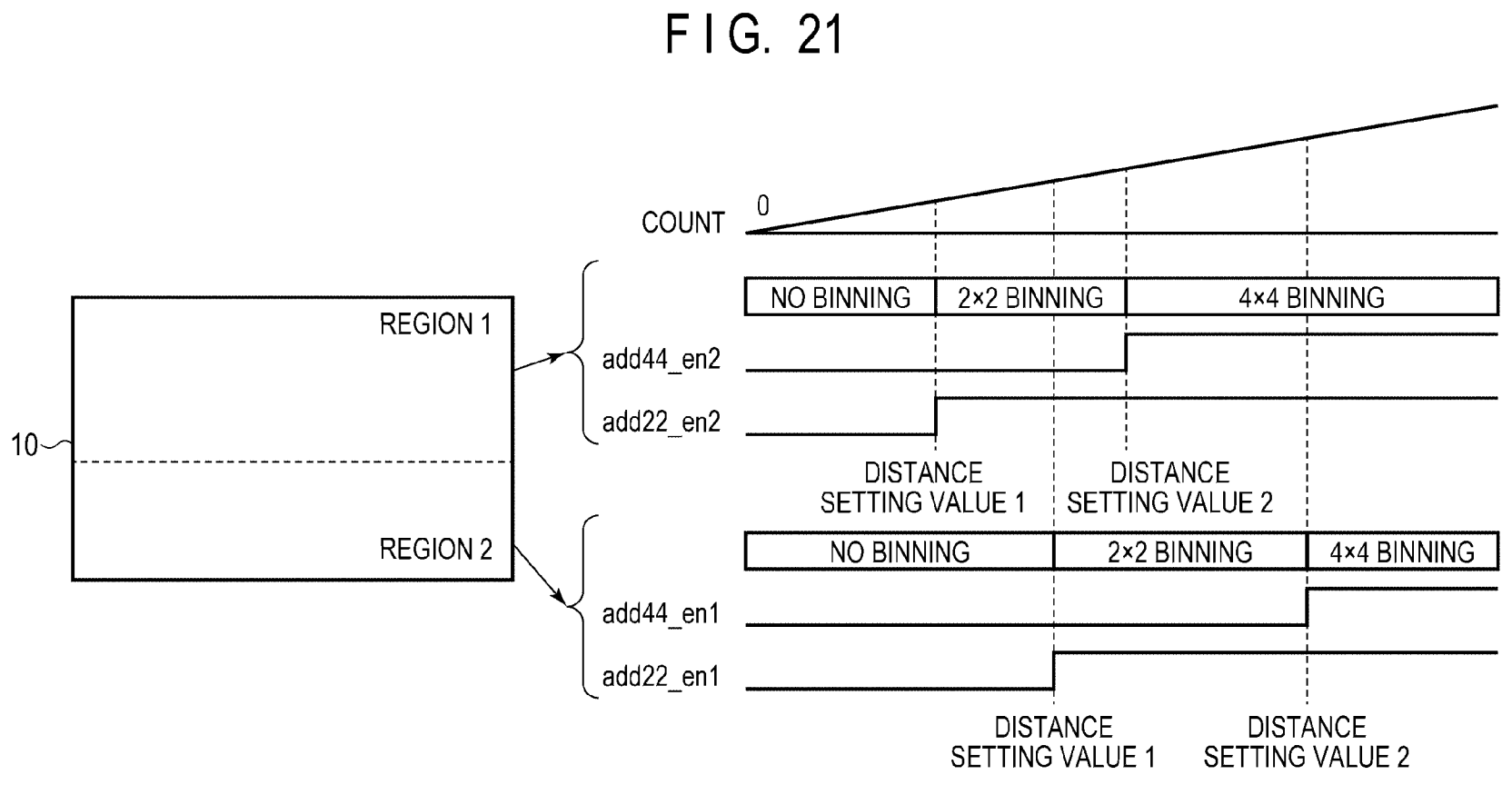

FIG. 21 is a diagram illustrating an operation example of the ranging device 1 according to the present embodiment. FIG. 21 illustrates an example of setting the region 1 and the region 2 in the light receiving unit 10, and an example of setting the distance setting value 1 and the distance setting value 2 in each region. Although FIG. 21 illustrates an example of the ranging device 1 for vehicles, the application of the ranging device 1 is not limited to vehicles. Further, "upper" and "lower" with respect to the region 1 and the region 2 are based on the vertical direction when the ranging device 1 is installed. That is, it is assumed that the region 1 is on the upper side in the vertical direction when the ranging device 1 is installed in a vehicle or the like, and the region 2 is on the lower side in the vertical direction when the ranging device 1 is installed in a vehicle or the like.

In the region 1, the distance setting value 2 is set to a relatively low value. As a result, in the region 1, the range in which the 4×4 binning is performed is wide, and setting is made to emphasize a relatively long distance. The distance setting value 1 is set to a relatively low value so that the width of the range in which no binning is performed and the width of the range in which the 2×2 binning is performed are approximately the same. By these settings, in the region 1, setting is made such that ranging can be performed even at a short distance to some extent while emphasizing a long distance.

In the region 2, the distance setting value 1 is set to a relatively high value. As a result, in the region 2, the range in which no binning is performed is wide, and setting is made to emphasize a relatively short distance. The distance setting value 2 is set to a relatively high value so that the width of the range in which the 2×2 binning is performed and the width of the range in which the 4×4 binning is performed are approximately the same. By these settings, in the region 2, setting is made such that ranging can be performed even at a long distance to some extent while emphasizing a short distance.

In a vehicle-mounted application, objects at a short distance are often detected on the lower side in the vertical direction within the ranging area, and objects at a long distance are often detected on the upper side in the vertical direction within the ranging area. Therefore, in the present embodiment, the setting of the distance setting value 1 and the setting of the distance setting value 2 is performed so that ranging at a long distance is emphasized on the upper side in the vertical direction and ranging at a short distance is emphasized on the lower side in the vertical direction. Even in applications other than in-vehicle applications, the distance setting value 1 and the distance setting value 2 different from each other may be set in consideration of the characteristics of the object measured in each region of the light receiving unit 10.

As described above, also in the present embodiment, similarly to the first embodiment, the ranging device and the driving method of the ranging device with improved followability are provided. Further, in the present embodiment, by setting different distance setting value 1 and distance setting value 2 for each region of the light receiving unit 10, more suitable ranging can be performed in consideration of the characteristics of the object, the ranging environment, and the like.

By combining the configuration of the present embodiment with the second embodiment, a method for changing the distance setting value and the determination threshold value may be set for each region. This makes it possible to perform more suitable ranging in consideration of characteristics of the object, the ranging environment, and the like.

Further, in the above-described example, the region is divided in the vertical direction, but the present embodiment is not limited thereto, and the range of the region can be appropriately changed according to the application of the ranging device 1.

Further, in the above example, the case where the setting value of the region 1 is "0" and the setting value of the region 2 is "1" is described, but these setting values may be reversed or may be dynamically switchable.

Fourth Embodiment

FIGS. 22A and 22B are block diagrams of equipment relating to an in-vehicle ranging device according to the present embodiment. Equipment 80 includes a distance measurement unit 803, which is an example of the ranging device of the above-described embodiments, and a signal processing device (processing device) that processes a signal from the distance measurement unit 803. The equipment 80 includes the distance measurement unit 803 that measures a distance to an object, and a collision determination unit 804 that determines whether or not there is a possibility of collision based on the measured distance. The distance measurement unit 803 is an example of a distance information acquisition unit that obtains distance information to the object. That is, the distance information is information on a distance to the object or the like. The collision determination unit 804 may determine the collision possibility using the distance information.

The equipment 80 is connected to a vehicle information acquisition device 810, and can obtain vehicle information such as a vehicle speed, a yaw rate, and a steering angle. Further, the equipment 80 is connected to a control ECU 820 which is a control device that outputs a control signal for generating a braking force to the vehicle based on the determination result of the collision determination unit 804. The equipment 80 is also connected to an alert device 830 that issues an alert to the driver based on the determination result of the collision determination unit 804. For example, when the collision possibility is high as the determination result of the collision determination unit 804, the control ECU 820 performs vehicle control to avoid collision or reduce damage by braking, returning an accelerator, suppressing engine output, or the like. The alert device 830 alerts the user by sounding an alarm, displaying alert information on a screen of a car navigation system or the like, or giving vibration to a seat belt or a steering wheel. These devices of the equipment 80 function as a movable body control unit that controls the operation of controlling the vehicle as described above.

In the present embodiment, ranging is performed in an area around the vehicle, for example, a front area or a rear area, by the equipment 80. FIG. 22B illustrates equipment when ranging is performed in the front area of the vehicle (ranging area 850). The vehicle information acquisition device 810 as a ranging control unit sends an instruction to the equipment 80 or the distance measurement unit 803 to perform the ranging operation. With such a configuration, the accuracy of distance measurement can be further improved.

Although the example of control for avoiding a collision to another vehicle has been described above, the embodiment is applicable to automatic driving control for following another vehicle, automatic driving control for not going out of a traffic lane, or the like. Furthermore, the equipment is not limited to a vehicle such as an automobile and can be applied to a movable body (movable apparatus) such as a ship, an airplane, a satellite, an industrial robot and a consumer use robot, or the like, for example. In addition, the equipment can be widely applied to equipment which utilizes object recognition or biometric authentication, such as an intelligent transportation system (ITS), a surveillance system, or the like without being limited to movable bodies.

Modified Embodiments

The present disclosure is not limited to the above embodiments, and various modifications are possible. For example, an example in which some of the configurations of any one of the embodiments are added to other embodiments and an example in which some of the configurations of any one of the embodiments are replaced with some of the configurations of other embodiments are also embodiments of the present disclosure.

In the first to third embodiments, the signal obtained by integrating the signals of the plurality of pixels 11 by binning is output from the light receiving unit 10 to the time conversion unit 24, but the order of binning and time conversion is not limited thereto. For example, a frequency distribution in which binning of a plurality of pixels 11 is performed may be generated by a method in which an output signal of each pixel 11 is subjected to time conversion in the time conversion unit 24, a conversion result is stored in a memory, and the converted signal is added for each pixel block. In this case, the function of the binning processing unit 110 may be provided in a stage subsequent to the time conversion unit 24, for example, in the frequency distribution holding unit 26. In this method, the circuit configuration of the light receiving unit 10 can be simplified. However, the techniques of the first to third embodiments have an advantage in that the processing load after the time conversion is reduced as compared with the technique in which binning is performed after the time conversion.

The disclosure of this specification includes a complementary set of the concepts described in this specification. That is, for example, if a description of "A is B" (A=B) is provided in this specification, this specification is intended to disclose or suggest that "A is not B" even if a description of "A is not B" (A≠B) is omitted. This is because it is assumed that "A is not B" is considered when "A is B" is described.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

It should be noted that any of the above-described embodiments is merely an example of an embodiment for carrying out the present disclosure, and the technical scope of the present disclosure should not be construed as being limited by the embodiments. That is, the present disclosure can be carried out in various forms without departing from the technical idea or the main features thereof.

According to the present disclosure, it is possible to provide a ranging device and a driving method of the ranging device with improved followability.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-167639, filed Oct. 19, 2022, which is hereby incorporated by reference herein in its entirety.

What is claimed is:

1. A ranging device comprising:
a light receiving unit configured to generate a signal based on incident light to each of a plurality of photoelectric conversion elements;
a time counting unit configured to perform time counting;
a control unit configured to control a light emission timing of a light emitting device that periodically emits light and a timing at which the time counting unit starts time counting;
a processing unit configured to operate in a first mode for outputting a signal based on incident light to a first number of photoelectric conversion elements among the plurality of photoelectric conversion elements and configured to operate in a second mode for outputting a signal based on incident light to a second number of photoelectric conversion elements among the plurality of photoelectric conversion elements, the second number being different from the first number; and
a time conversion unit configured to generate a signal indicating a time at which light is incident on the light receiving unit based on a time count value input from the time counting unit and a signal generated in the light receiving unit,
wherein switching from the first mode to the second mode is performed in a period from the start of light emission of the light emitting device to the next start of light emission of the light emitting device.

2. The ranging device according to claim 1, wherein the second number is greater than the first number.

3. The ranging device according to claim 2, wherein the second number of photoelectric conversion elements includes all of the first number of photoelectric conversion elements.

4. The ranging device according to claim 1,
wherein the processing unit is further configured to operate in a third mode for outputting a signal based on incident light to a third number of photoelectric conversion elements among the plurality of photoelectric conversion elements, the third number being different from the first number and the second number, and wherein switching from the first mode to the second mode and switching from the second mode to the third mode are performed in a period from the start of light emission of the light emitting device to the next start of light emission of the light emitting device.

5. The ranging device according to claim 4, wherein the third number is greater than the second number, and the second number is greater than the first number.

6. The ranging device according to claim 1, wherein in the second mode, the processing unit adds the second number of signals to generate a multi-bit signal indicating the number of photoelectric conversion elements in which the incident light is detected among the second number of photoelectric conversion elements.

7. The ranging device according to claim 1, wherein in the second mode, the processing unit generates a 1-bit signal obtained by integrating the second number of signals.

8. The ranging device according to claim 1, wherein the processing unit further outputs a signal indicating an address of a photoelectric conversion element in which the incident light is detected.

9. The ranging device according to claim 1, wherein in the second mode, reflected light from an object located at a longer distance than in the first mode is detected.

10. The ranging device according to claim 1, wherein a timing of switching from the first mode to the second mode is variable each time a period from the start of light emission of the light emitting device to the next start of light emission of the light emitting device elapses.

11. The ranging device according to claim 10 further comprising a distance calculation unit configured to calculate distance information based on an output signal of the time conversion unit,
wherein the timing of switching from the first mode to the second mode is changed based on a calculation result of the distance information in the distance calculation unit.

12. The ranging device according to claim 11, wherein when the amount of incident light used for calculating the distance information does not exceed a threshold value, the timing of switching from the first mode to the second mode is changed.

13. The ranging device according to claim 11, wherein a threshold value of the amount of incident light used for calculating the distance information is changed based on the calculation result of the distance information in the distance calculation unit.

14. The ranging device according to claim 11, wherein the number of accumulation of the amount of incident light used for calculating the distance information is changed based on the calculation result of the distance information in the distance calculation unit.

15. The ranging device according to claim 10,
wherein the plurality of photoelectric conversion elements are arranged to form a plurality of rows and a plurality of columns, and
wherein the timing of switching from the first mode to the second mode in a first region of the plurality of photoelectric conversion elements and the timing of switching from the first mode to the second mode in a second region of the plurality of photoelectric conversion elements are different from each other.

16. The ranging device according to claim 15,
wherein when the ranging device is installed, the first region is arranged above the second region in a vertical direction, and wherein the timing of switching from the first mode to the second mode in the first region is earlier than the timing of switching from the first mode to the second mode in the second region.

17. The ranging device according to claim 1, wherein in the second mode, the processing unit integrates the second number of signals and outputs the integrated signal to the time conversion unit.

18. The ranging device according to claim 1, wherein in the second mode, the time conversion unit generates a signal indicating a time at which light is incident on the light receiving unit, and outputs the signal to the processing unit.

19. A movable body comprising:

the ranging device according to claim 1; and a movable body control unit configured to control the movable body based on distance information acquired by the ranging device.

20. A driving method of a ranging device, the ranging device including:

a light receiving unit configured to generate a signal based on incident light to each of a plurality of photoelectric conversion elements;

a time counting unit configured to perform time counting;

a control unit configured to control a light emission timing of a light emitting device that periodically emits light and a timing at which the time counting unit starts time counting; and a time conversion unit configured to generate a signal indicating a time at which light is incident on the light receiving unit based on a time count value input from the time counting unit and a signal generated in the light receiving unit, the driving method comprising:

in a period from the start of light emission of the light emitting device to the next start of light emission of the light emitting device, operating in a first mode for outputting a signal based on incident light to a first number of photoelectric conversion elements among the plurality of photoelectric conversion elements, and operating in a second mode for outputting a signal based on incident light to a second number of photoelectric conversion elements among the plurality of photoelectric conversion elements, the second number being different from the first number.

* * * * *